(12) United States Patent
Misawa

(10) Patent No.: US 12,288,231 B2
(45) Date of Patent: Apr. 29, 2025

(54) CHARGING CONTROLLER

(71) Applicant: TOYOTA JIDOSHA KABUSHIKI KAISHA, Aichi-ken (JP)

(72) Inventor: Takahiro Misawa, Okazaki (JP)

(73) Assignee: TOYOTA JIDOSHA KABUSHIKI KAISHA, Aichi-Ken (JP)

( * ) Notice: Subject to any disclaimer, the term of this patent is extended or adjusted under 35 U.S.C. 154(b) by 686 days.

(21) Appl. No.: 17/561,882

(22) Filed: Dec. 24, 2021

(65) Prior Publication Data
US 2022/0207578 A1    Jun. 30, 2022

(30) Foreign Application Priority Data

Dec. 28, 2020  (JP) .................................. 2020-218616

(51) Int. Cl.
| | |
|---|---|
| G06Q 30/02 | (2023.01) |
| B60L 53/66 | (2019.01) |
| B60L 58/12 | (2019.01) |
| G06Q 30/0283 | (2023.01) |
| H02J 7/00 | (2006.01) |
| B60L 53/14 | (2019.01) |

(52) U.S. Cl.
CPC ........ G06Q 30/0284 (2013.01); B60L 53/665 (2019.02); B60L 58/12 (2019.02); H02J 7/0048 (2020.01); H02J 7/007 (2013.01); B60L 53/14 (2019.02)

(58) Field of Classification Search
CPC ............ G06Q 30/0284; G06Q 30/0283; B60L 53/67; B60L 58/12; B60L 53/63; B60L 53/64
USPC ........................................ 705/7.35, 400, 412
See application file for complete search history.

(56) References Cited

U.S. PATENT DOCUMENTS

| | | | | |
|---|---|---|---|---|
| 10,065,520 | B2 * | 9/2018 | Zhang ................... | G07F 15/005 |
| 10,486,540 | B2 * | 11/2019 | Tsuchiya ................. | B60L 58/12 |
| 11,279,251 | B2 * | 3/2022 | Muramatsu ............. | B60L 53/62 |
| 2012/0217928 | A1 * | 8/2012 | Kulidjian .............. | B60L 3/0069 |
| | | | | 307/131 |

(Continued)

FOREIGN PATENT DOCUMENTS

| | | | |
|---|---|---|---|
| CN | 108146259 A | 6/2018 | |
| DE | 112014001783 T5 * | 12/2015 | .......... B60L 11/1838 |

(Continued)

OTHER PUBLICATIONS

Durch, Kyle, Charging to Charge: Why Rate Transparency and Battery Storage are Needed to Expand EV Charging Infrastructure—Richmond Journal of Law and Technology, Oct. 2, 2020, 12 pages (Year: 2020).*

*Primary Examiner* — Shannon S Campbell
*Assistant Examiner* — Freda A Nelson
(74) *Attorney, Agent, or Firm* — HAUPTMAN HAM, LLP

(57) ABSTRACT

A charging controller is configured to carry out charging of a power storage with charging power to be restricted and to quit charging when a charging quitting condition is satisfied while charging is carried out. The charging controller is configured to change the charging quitting condition to move end of charging ahead in charging of the power storage by using a power feed facility when pricing of the power feed facility falls under time-based pricing and restriction of charging power is severer than a prescribed level, the time-based pricing being pricing that a fee is charged based on a charging time period.

16 Claims, 17 Drawing Sheets

(56) References Cited

U.S. PATENT DOCUMENTS

| | | | |
|---|---|---|---|
| 2013/0119947 A1 | 5/2013 | Ishida et al. | |
| 2018/0154792 A1 | 6/2018 | Wada | |
| 2019/0092176 A1* | 3/2019 | Uyeki | B60L 53/665 |
| 2019/0217739 A1* | 7/2019 | Sinha | B60L 53/62 |
| 2019/0241085 A1* | 8/2019 | Hiroe | B60L 53/16 |
| 2020/0198487 A1* | 6/2020 | Muramatsu | H02J 7/0048 |
| 2021/0273453 A1* | 9/2021 | Nishio | H02J 3/32 |

FOREIGN PATENT DOCUMENTS

| | | |
|---|---|---|
| JP | 5417280 B2 | 2/2014 |
| JP | 201893658 A | 6/2018 |

* cited by examiner

CHARGING CONTROLLER

This nonprovisional application is based on Japanese Patent Application No. 2020-218616 filed with the Japan Patent Office on Dec. 28, 2020, the entire contents of which are hereby incorporated by reference.

BACKGROUND

Field

The present disclosure relates to a charging controller.

Description of the Background Art

Japanese Patent Laying-Open No. 2018-093658 discloses a charging controller that carries out charging control different between a case where a charging location is a home and a case where the charging location is not the home. When the charging location is the home, this charging controller carries out first charging control until a voltage of a power storage is equal to or higher than a prescribed voltage (Vp) and thereafter carries out second charging control until the voltage of the power storage is equal to or higher than an upper limit voltage (UL). When the charging location is not the home, the charging controller carries out only first charging control and does not carry out second charging control.

In charging control above, the upper limit voltage (UL) is set for protecting the power storage. The voltage of the power storage becomes higher as an amount of stored power in the power storage (that is, an amount of electric power stored in the power storage) increases. In second charging control, a charging current lower than in first charging control is set. Second charging control is charging control in which a charging current is lowered when the power storage is almost fully charged and the power storage is charged with the low charging current until the voltage of the power storage reaches the upper limit voltage. Second charging control is generally also called "forced charging control." As forced charging control is carried out as the power storage is almost fully charged, increase in voltage of the power storage by charging is suppressed, and hence an amount of stored power in the power storage at the time of completion of charging (that is, when the voltage of the power storage reaches the upper limit voltage) is larger.

SUMMARY

The charging controller described in Japanese Patent Laying-Open No. 2018-093658 moves end of charging ahead by not carrying out second charging control when the charging location is not the home. When the charging location is not the home, the power storage may be charged in a public power feed facility of time-based pricing. When charging is carried out in the power feed facility of the time-based pricing, a charge fee is saved by moving the end of charging ahead as above.

Charging power for the power storage may be restricted in a case other than forced charging control. For example, in a power storage mounted on a vehicle, in order to protect the power storage itself and peripheral components thereof, charging power for the power storage may be restricted. Japanese Patent Laying-Open No. 2018-093658 does not discuss restriction of charging power in a case other than forced charging control.

There are also public power feed facilities based on pricing other than time-based pricing. For example, when the power storage is charged in a power feed facility of flat-rate pricing, a charge fee is not saved even though end of charging is moved ahead.

The present disclosure was made to solve the problem above, and an object thereof is to provide a charging controller capable of carrying out appropriate charging control in accordance with pricing of a power feed facility.

A charging controller according to the present disclosure is configured to carry out charging of a power storage with charging power to be restricted and to quit charging when a charging quitting condition is satisfied while charging is carried out. This charging controller is configured to change the charging quitting condition to move end of charging ahead in charging of the power storage by using a power feed facility when pricing of the power feed facility falls under time-based pricing and restriction of the charging power is severer than a prescribed level, the time-based pricing being pricing that a fee is charged based on a charging time period.

When charging power for the power storage is restricted, charging proceeds more slowly than when charging power for the power storage is not restricted, and progress of charging is slower as restriction is severer. In time-based pricing, the charge fee is higher as a charging time period is longer. When charging proceeds slowly in charging by using the power feed facility of the time-based pricing, the charge fee tends to be high.

In charging of the power storage by using the power feed facility, when the pricing of the power feed facility falls under time-based pricing and charging power for the power storage is restricted more severely than the prescribed level, the charging controller changes the charging quitting condition to move end of charging ahead. Under such control, an excessively high charge fee can be suppressed in charging by using the power feed facility of the time-based pricing. The charging controller can thus carry out appropriate charging control in accordance with the pricing of the power feed facility.

The charging controller may include an obtaining unit, a determination unit, a first charging manager, and a charging control unit which will be described below. The obtaining unit is configured to obtain pricing information indicating the pricing of the power feed facility. The determination unit is configured to determine whether or not restriction of the charging power is severer than the prescribed level. The first charging manager is configured to set the charging quitting condition. The charging control unit is configured to carry out charging of the power storage and to quit charging when the charging quitting condition is satisfied while charging is carried out. The first charging manager is configured to change, in charging of the power storage by using the power feed facility, the charging quitting condition to move end of charging ahead when the pricing of the power feed facility indicated by the pricing information falls under the time-based pricing and the determination unit determines that restriction of the charging power is severer than the prescribed level.

The pricing information may indicate whether the pricing of the power feed facility falls under time-based pricing (that is, pricing that a fee is charged based on a charging time period), usage-based pricing (that is, pricing that a fee is charged based on an amount of electric power for charging), or flat-rate pricing (that is, pricing that a fee for one charging is flat).

The obtaining unit may obtain pricing information from the power feed facility or from a database that manages information on the power feed facility, or may request a computer that can obtain information on the power feed facility to give pricing information.

The charging controller may further include a charging restriction unit that sets an upper limit value of charging power for the power storage. The determination unit may determine whether or not restriction of charging power is severer than a prescribed level with an approach as shown below.

When the upper limit value of the charging power is smaller than a first threshold value, the determination unit may determine that restriction of the charging power is severer than the prescribed level, and when the upper limit value of the charging power is larger than the first threshold value, the determination unit may determine that restriction of the charging power is not severer than the prescribed level.

When the charging restriction unit sets the upper limit value of the charging power, the determination unit may determine that restriction of the charging power is severer than the prescribed level, and when the charging restriction unit does not set the upper limit value of the charging power, the determination unit may determine that restriction of the charging power is not severer than the prescribed level.

When charging is not completed in spite of the charging time period reaching a prescribed time period in charging of the power storage by using the power feed facility, the determination unit may determine that restriction of the charging power is severer than the prescribed level.

The charging quitting condition may be satisfied when an SOC of the power storage is equal to or higher than a second threshold value. The first charging manager may move end of charging ahead by decreasing the second threshold value in the changing the charging quitting condition. In such a configuration, when the SOC of the power storage reaches the second threshold value as a result of charging, charging ends. As the second threshold value is smaller, charging ends earlier. Therefore, by decreasing the second threshold value, end of charging can be moved ahead.

The charging quitting condition may be satisfied when a parameter that correlates with an amount of charging is equal to or larger than a third threshold value. The first charging manager may move end of charging ahead by decreasing the third threshold value in the changing the charging quitting condition. In such a configuration, as the parameter that correlates with an amount of charging reaches the third threshold value, charging ends. As the third threshold value is smaller, charging ends earlier. Therefore, end of charging can be moved ahead by decreasing the third threshold value. The amount of charging refers to an amount of input electric power to the power storage by charging. The parameter that correlates with the amount of charging may be the amount of charging itself or a charging time period. As the charging time period is longer, the amount of charging is larger. The parameter that correlates with the amount of charging may be an amount of increase in SOC by charging.

The power storage may be mounted on a vehicle. The vehicle may travel with electric power stored in the power storage. The first charging manager may set the charging quitting condition such that the power storage is charged with electric power in amount necessary for the vehicle to reach a prescribed location. According to such a configuration, running out of power in the vehicle before reaching a prescribed location (that is, the vehicle being unable to travel due to a small amount of electric power stored in the power storage) can be suppressed. The vehicle may be an electric vehicle (EV) or a plug-in hybrid vehicle (PHV). The charging controller may also be mounted on the vehicle together with the power storage.

Any charging controller described above may further include a second charging manager which will be described below. The second charging manager is configured to obtain a destination of the vehicle and to set the prescribed location based on the destination. The second charging manager sets as the prescribed location, any one of the destination and a power feed facility present on a travel route before the vehicle reaches the destination. According to such a configuration, the vehicle running out of power before reaching the destination can be suppressed.

Any charging controller described above may further include a third charging manager which will be described below. The third charging manager is configured to prohibit change of the charging quitting condition. In charging of the power storage by using the power feed facility, when the pricing of the power feed facility indicated by the pricing information falls under the time-based pricing and the determination unit determines that restriction of the charging power is severer than the prescribed level, the third charging manager issues to a user, a request to provide an input indicating whether or not to permit change of the charging quitting condition, and prohibits change of the charging quitting condition in response to reception of an input indicating prohibition from the user. According to such a configuration, when charging power for the power storage is restricted more severely than the prescribed level in charging by using the power feed facility of the time-based pricing, the user can select whether or not to move end of charging ahead. The user can suppress an excessively high fee for charging by permitting change of the charging quitting condition. The user can also bring the power storage closer to a fully charged state by prohibiting change of the charging quitting condition.

Any charging controller described above may further include a notification unit which will be described below. The notification unit is configured to give information on charging to a user. In charging of the power storage by using the power feed facility, when the pricing of the power feed facility indicated by the pricing information falls under pricing other than the time-based pricing and the determination unit determines that restriction of the charging power is severer than the prescribed level, the notification unit notifies the user of a waiting time until charging is completed.

For example, in each of usage-based pricing and flat-rate pricing, even when charging power for the power storage is restricted and charging proceeds slowly, the charge fee does not become high in principle. When charging proceeds slowly, however, time to wait for completion of charging becomes long. According to the configuration, the user can know a waiting time and hence convenience of the user is improved. The user can finish his/her errands during the waiting time or stop charging in progress.

The first charging manager may be configured to change, in charging of the power storage by using the power feed facility, the charging quitting condition to extend the charging time period when the pricing of the power feed facility indicated by the pricing information falls under flat-rate pricing and the determination unit determines that restriction of the charging power is not severer than the prescribed level.

In flat-rate pricing, the charge fee is the same regardless of whether or not the amount of charging increases or whether or not the charging time period is longer. Therefore, in charging by using the power feed facility of the flat-rate pricing, as the charging time period is longer, the amount of charging per one charging increases and economic efficiency is higher. The charging controller is configured to carry out control to shorten the charging time period when the power storage is charged by using the power feed facility of the time-based pricing and to carry out control to extend the charging time period when the power storage is charged by using the power feed facility of the flat-rate pricing. The charging controller can carry out appropriate charging control in accordance with the pricing of the power feed facility.

The foregoing and other objects, features, aspects and advantages of the present disclosure will become more apparent from the following detailed description of the present disclosure when taken in conjunction with the accompanying drawings.

DESCRIPTION OF THE PREFERRED EMBODIMENTS

Figure 1:
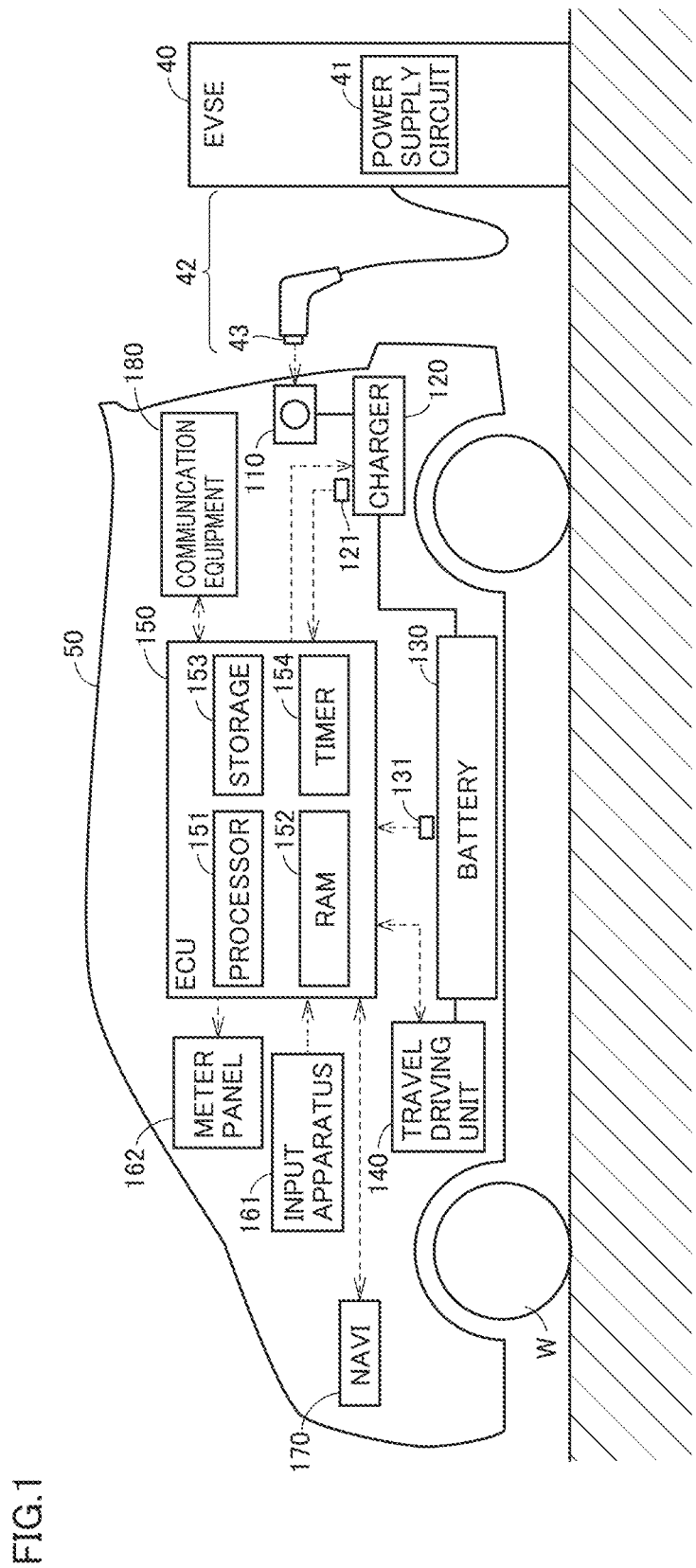
FIG. 1 is a diagram showing a configuration of a vehicle to which a charging controller according to a first embodiment of the present disclosure is applied.

An embodiment of the present disclosure will be described in detail below with reference to the drawings. The same or corresponding elements in the drawings have the same reference characters allotted and description thereof will not be repeated.

[First Embodiment]

FIG. 1 is a diagram showing a configuration of a vehicle 50 according to this embodiment. Referring to FIG. 1, vehicle 50 includes a battery 130 that stores electric power for traveling. Vehicle 50 can travel with electric power stored in battery 130. Vehicle 50 according to this embodiment is an electric vehicle (EV) not including an engine (internal combustion engine). Without being limited as such, vehicle 50 may be a plug-in hybrid vehicle (PHV) that can travel with both of electric power stored in battery 130 and output from an engine (not shown). Though a user drives vehicle 50 in this embodiment, vehicle 50 may be an autonomous vehicle.

Battery 130 includes a secondary battery such as a lithium ion battery or a nickel metal hydride battery. In this embodiment, a battery assembly including a plurality of lithium ion batteries is adopted as the secondary battery. The battery assembly is composed of a plurality of secondary batteries (which are generally also referred to as "cells") electrically connected to one another. Instead of the secondary battery, another power storage such as an electric double layer capacitor may be adopted. Battery 130 according to this embodiment corresponds to an exemplary "power storage" according to the present disclosure.

Vehicle 50 includes an electronic control unit (which is referred to as an "ECU" below) 150. ECU 150 carries out charging control and discharging control of battery 130. ECU 150 controls communication with the outside of vehicle 50. ECU 150 according to this embodiment corresponds to an exemplary "charging controller" according to the present disclosure.

Vehicle 50 further includes a monitoring module 131 that monitors a state of battery 130. Monitoring module 131 includes various sensors that detect a state (for example, a voltage, a current, and a temperature) of battery 130 and outputs a result of detection to ECU 150. Monitoring module 131 may be a battery management system (BMS) that further performs, in addition to the sensor function, a state of charge (SOC) estimation function, a state of health (SOH) estimation function, a function to equalize a cell voltage, a diagnosis function, and a communication function. ECU 150 can obtain a state (for example, a temperature, a current, a voltage, an SOC, and an internal resistance) of battery 130 based on an output from monitoring module 131. The state of charge (SOC) represents a remaining amount of power storage, and it is expressed, for example, as a ratio of a current amount of stored power to an amount of stored power in a fully charged state that ranges from 0 to 100%.

For example, such a known approach as a current integration method or an OCV estimation method can be adopted as a method of measuring the SOC.

Vehicle 50 includes an inlet 110 and a charger 120 adapted to a power feed type of EVSE 40. Inlet 110 receives electric power supplied from the outside of vehicle 50. Though FIG. 1 shows only inlet 110 and charger 120, vehicle 50 may include a plurality of inlets so as to adapt to a plurality of types of power feed (for example, both of an alternating-current (AC) type and a direct-current (DC) type).

EVSE 40 includes a power supply circuit 41. A charging cable 42 is connected to EVSE 40. Charging cable 42 may always be connected to EVSE 40 or may be attachable to and removable from EVSE 40. Charging cable 42 includes a connector 43 at its tip end and contains a power line. Inlet 110 is configured such that connector 43 of charging cable 42 can be connected thereto. As connector 43 of charging cable 42 connected to EVSE 40 is connected to inlet 110 of vehicle 50, EVSE 40 and vehicle 50 are electrically connected to each other. Electric power can thus be supplied from EVSE 40 through charging cable 42 to vehicle 50.

Charger 120 is located between inlet 110 and battery 130. Charger 120 includes a charge relay that switches between connection and disconnection of an electric power path from inlet 110 to battery 130 and a power conversion circuit (neither of which is shown). The power conversion circuit converts electric power received from a side of inlet 110 into electric power suitable for charging of battery 130 and outputs resultant electric power toward battery 130. The power conversion circuit may include a power factor correction (PFC) circuit, an inverter, an insulating circuit (for example, an insulating transformer), and a rectification circuit. ECU 150 controls each of the charge relay and the power conversion circuit included in charger 120. Vehicle 50 further includes a monitoring module 121 that monitors a state of charger 120. Monitoring module 121 includes various sensors that detect a state of charger 120 and outputs a result of detection to ECU 150. In this embodiment, monitoring module 121 detects a voltage and a current input to and output from the power conversion circuit. Monitoring module 121 detects charging power for battery 130.

As EVSE 40 and inlet 110 are connected to each other through charging cable 42, electric power can be supplied and received between EVSE 40 and vehicle 50. External charging of vehicle 50 (that is, charging of battery 130 of vehicle 50 by receiving supply of electric power from the outside of vehicle 50) can be carried out. Electric power for external charging is supplied, for example, from EVSE 40 through charging cable 42 to inlet 110. Charger 120 converts electric power received at inlet 110 into electric power suitable for charging of battery 130 and outputs resultant electric power to battery 130. When external charging is performed, the charge relay of charger 120 is closed (connected), and when external charging is not performed, the charge relay of charger 120 is opened (disconnected).

ECU 150 includes a processor 151, a random access memory (RAM) 152, a storage 153, and a timer 154. For example, a central processing unit (CPU) can be adopted as processor 151. RAM 152 functions as a work memory that temporarily stores data to be processed by processor 151. Storage 153 can store information that is put thereinto. Storage 153 includes, for example, a read only memory (ROM) and a rewritable non-volatile memory. Storage 153 stores not only a program but also information (for example, a map, a mathematical expression, and various parameters) to be used by a program. As a program stored in storage 153 is executed by processor 151, various types of control by ECU 150 are carried out in this embodiment. Various types of control by ECU 150 are not limited to control carried out by software but can also be carried out by dedicated hardware (electronic circuitry). Any number of processors may be provided in ECU 150 and a processor may be prepared for each prescribed type of control.

Timer 154 notifies processor 151 that the set time has come. As the time set in timer 154 comes, timer 154 transmits a signal to that effect to processor 151. In this embodiment, a timer circuit is adopted as timer 154. Timer 154 may be implemented by software instead of hardware (timer circuitry). ECU 150 can obtain current time from a real time clock (RTC) circuit (not shown) contained in ECU 150.

Vehicle 50 further includes a travel driving unit 140, an input apparatus 161, a meter panel 162, a navigation system (which is referred to as a "NAVI" below) 170, communication equipment 180, and a drive wheel W. Vehicle 50 is not limited to a front-wheel-drive vehicle shown in FIG. 1 and it may be a rear-wheel-drive vehicle or a four-wheel-drive vehicle.

Travel driving unit 140 includes a power control unit (PCU) and a motor generator (MG) which are not shown, and allows vehicle 50 to travel with electric power stored in battery 130. The PCU includes, for example, an inverter, a converter, and a relay (none of which is shown). The relay included in the PCU is referred to as a "system main relay (SMR)" below. The inverter, the converter, and the SMR of the PCU are controlled by ECU 150. The MG is implemented, for example, by a three-phase AC motor generator. The MG is driven by the PCU and rotates drive wheel W. The MG performs regeneration and supplies regenerated electric power to battery 130. The SMR switches between connection and disconnection of an electric power path from battery 130 to the MG. The SMR is closed (connected) when vehicle 50 travels.

Input apparatus 161 accepts an input from a user. Input apparatus 161 is operated by a user and outputs a signal corresponding to the operation by the user to ECU 150. Examples of input apparatus 161 include various switches, various pointing devices, a keyboard, and a touch panel. Input apparatus 161 may be a smart speaker that accepts audio input.

Meter panel 162 shows information on vehicle 50. Meter panel 162 shows, for example, various types of information on vehicle 50 measured by various sensors mounted on vehicle 50. Information shown on meter panel 162 may include at least one of an outdoor temperature, a traveling speed of vehicle 50, an SOC of battery 130, average electric power consumption, and a travel distance of vehicle 50. Meter panel 162 is controlled by ECU 150. ECU 150 may have meter panel 162 show a message for a user or a warning indicator when a prescribed condition is satisfied.

NAVI 170 includes a processor, a storage, a touch panel display, and a global positioning system (GPS) module (none of which is shown). The storage stores map information. The touch panel display accepts an input from a user or shows a map and other types of information. The GPS module receives a signal (which is referred to as a "GPS signal" below) from a GPS satellite. NAVI 170 can identify a position of vehicle 50 based on a GPS signal. NAVI 170 conducts a path search for finding a travel route (for example, a shortest route) from the current position of vehicle 50 to a destination based on an input from the user, and shows the travel route found by the path search on a map.

Communication equipment 180 includes various communication interfaces (I/F). Communication equipment 180 may include a data communication module (DCM). Communication equipment 180 may include a communication I/F adapted to the Fifth Generation Mobile Communication System (5G). ECU 150 wirelessly communicates with a communication apparatus outside vehicle 50 through communication equipment 180.

Figure 2:
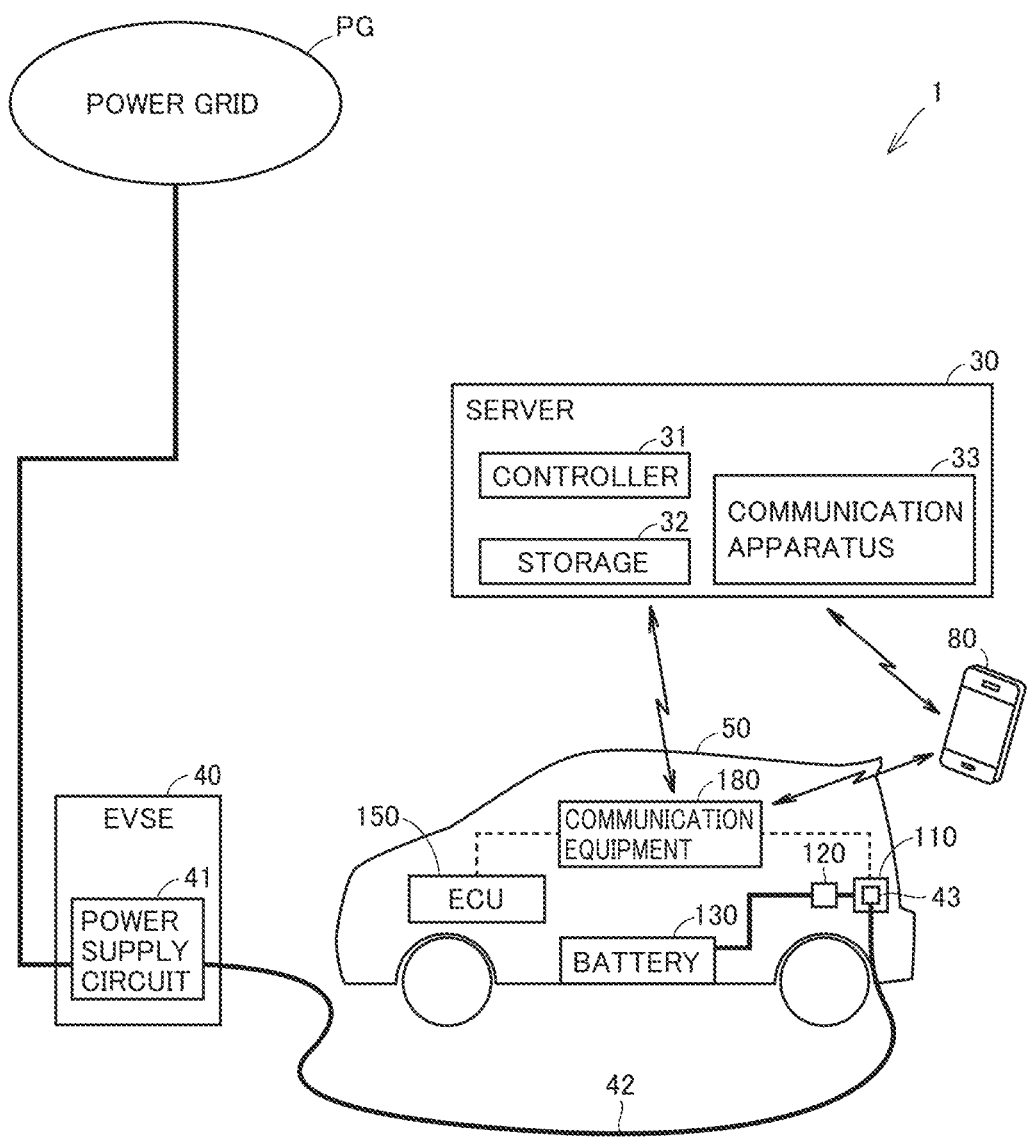
FIG. 2 is a diagram showing a schematic configuration of an electric power system according to the first embodiment of the present disclosure.

FIG. 2 is a diagram showing a schematic configuration of an electric power system according to this embodiment. Referring to FIG. 2, an electric power system 1 includes a power grid PG, server 30, EVSE 40, vehicle 50, and a portable terminal 80. In this embodiment, an AC power feed facility that provides AC power is adopted as EVSE 40. EVSE 40 may be public EVSE that a large number of unspecified users are permitted to use. Vehicle 50 is configured as shown in FIG. 1. Vehicle 50 may be a personally owned vehicle (POV) or a mobility as a service (MaaS) vehicle. The MaaS vehicle is a vehicle managed by a MaaS entity. Portable terminal 80 corresponds to a portable terminal carried by a user of vehicle 50. In this embodiment, a smartphone equipped with a touch panel display is adopted as portable terminal 80. Without being limited thereto, any portable terminal can be adopted as portable terminal 80, and a tablet terminal, a wearable device (for example, a smart watch), an electronic key, or a service tool can also be adopted.

Power grid PG is a power network provided by an electric utility (for example, an electric power company). Power grid PG is electrically connected to a plurality of pieces of EVSE (including EVSE 40) and supplies AC power to each piece of EVSE. Power supply circuit 41 contained in EVSE 40 converts electric power supplied from power grid PG into electric power suitable for external charging. Power supply circuit 41 may include a sensor for detecting charging power. As shown in FIG. 2, as connector 43 of charging cable 42 connected to EVSE 40 is connected to inlet 110 of vehicle 50, vehicle 50 and EVSE 40 can communicate with each other and EVSE 40 and battery 130 can supply and receive electric power therebetween. Preparation for external charging is thus completed. As the charge relay of charger 120 is closed, battery 130 is electrically connected to power grid PG. As electric power is supplied from power grid PG through power supply circuit 41, charging cable 42, and charger 120 to battery 130, battery 130 is externally charged.

Communication equipment 180 mounted on vehicle 50 communicates with EVSE 40 through charging cable 42. Communication between EVSE 40 and vehicle 50 may be of any type, and for example, controller area network (CAN) or PLC may be adopted. Standards of communication between EVSE 40 and vehicle 50 may be ISO/IEC15118 or IEC61851.

Communication equipment 180 mounted on vehicle 50 wirelessly communicates with server 30, for example, through a mobile communication network (telematics). A protocol of communication between server 30 and vehicle 50 may be OpenADR. A signal exchanged between communication equipment 180 and server 30 may be encrypted. In this embodiment, communication equipment 180 and portable terminal 80 wirelessly communicate with each other. Communication equipment 180 and portable terminal 80 may communicate with each other through short-range communication such as Bluetooth® (for example, direct communication in a vehicle or within an area around the vehicle).

Prescribed application software (which is simply referred to as an "application" below) is installed in portable terminal 80. Portable terminal 80 is carried by a user of vehicle 50 and can exchange information with server 30 through the application. The user can operate the application, for example, through the touch panel display of portable terminal 80.

Server 30 includes a controller 31, a storage 32, and a communication apparatus 33. Controller 31 includes a processor, performs prescribed information processing, and controls communication apparatus 33. Various types of information can be stored in storage 32. Communication apparatus 33 includes various communication I/Fs. Controller 31 communicates with the outside through communication apparatus 33.

Server 30 can communicate with each of vehicle 50 and portable terminal 80. Server 30 may communicate with EVSE 40. EVSE 40 may communicate with an EVSE management cloud. A protocol of communication between EVSE 40 and the EVSE management cloud may be open charge point protocol (OCPP).

Figure 3:
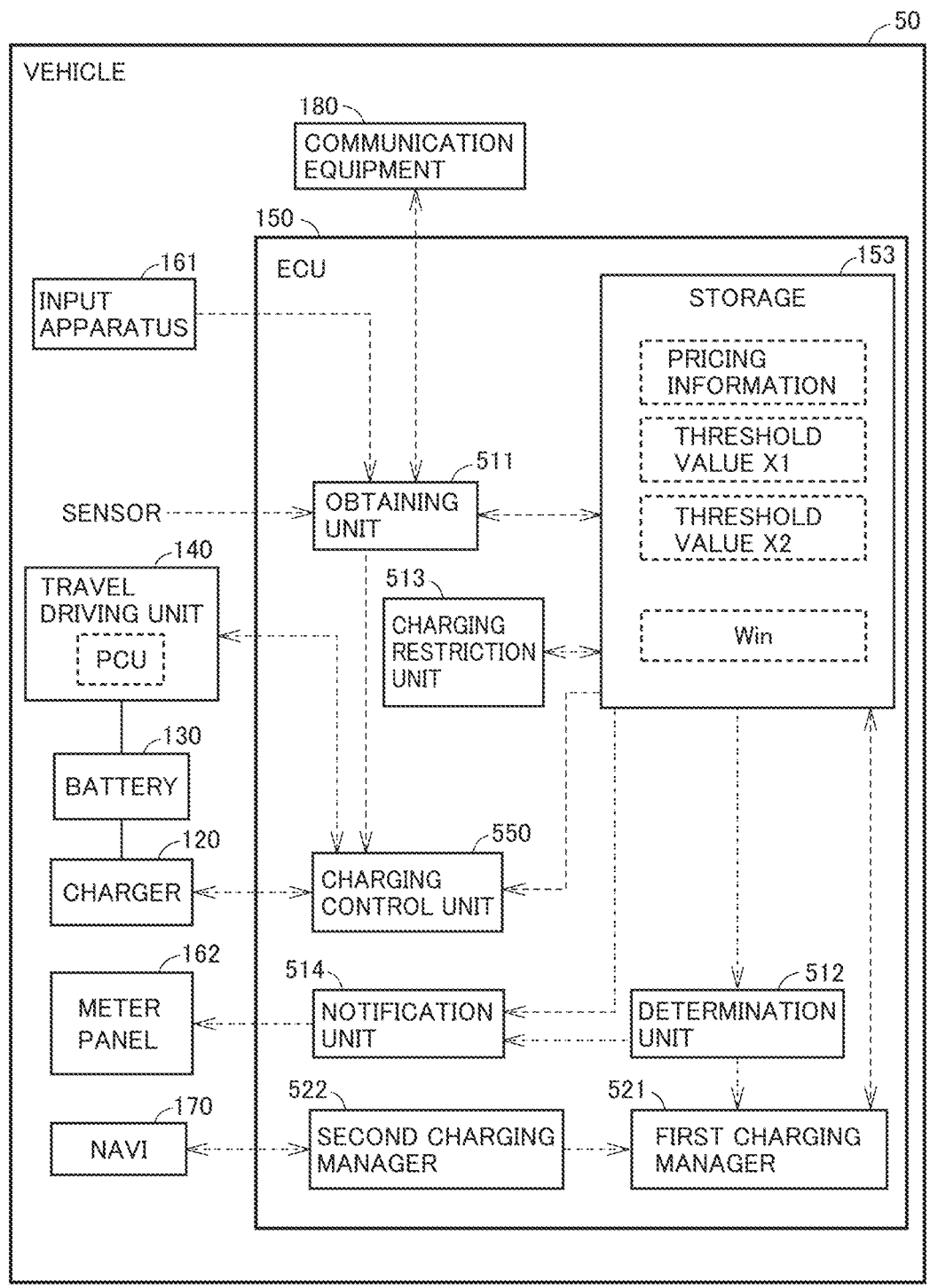
FIG. 3 is a diagram showing a detailed configuration of the charging controller according to the first embodiment of the present disclosure.

FIG. 3 is a diagram showing a detailed configuration of ECU 150 of vehicle 50. Referring to FIG. 3 together with FIGS. 1 and 2, ECU 150 includes an obtaining unit 511, a determination unit 512, a charging restriction unit 513, a notification unit 514, a first charging manager 521, a second charging manager 522, and a charging control unit 550. In ECU 150 according to this embodiment, each unit is implemented by processor 151 shown in FIG. 1 and a program executed by processor 151 (more specifically, a program stored in storage 153). Without being limited as such, each unit may be implemented by dedicated hardware (electronic circuitry).

Charging control unit 550 can carry out external charging of battery 130. Charging control unit 550 is configured to carry out external charging of battery 130 and to quit external charging when a prescribed charging quitting condition is satisfied while external charging is carried out. Charging control unit 550 is configured to control charging of battery 130 by controlling charger 120.

Charging restriction unit 513 is configured to set an upper limit value (which is denoted as "Win" below) of charging power for battery 130. Set Win is stored in storage 153. Charging control unit 550 controls charging power for battery 130 so as not to exceed Win set by charging restriction unit 513. As Win is smaller, restriction of charging power based on Win is severer. In regeneration during travel, charging control unit 550 adjusts charging power for battery 130, for example, by controlling the PCU of travel driving unit 140. During external charging, charging control unit 550 adjusts charging power for battery 130, for example, by controlling charger 120.

Obtaining unit 511 obtains a state of vehicle 50 from outputs from various sensors mounted on vehicle 50. Obtaining unit 511 may have the obtained state of vehicle 50 recorded in storage 153. Charging restriction unit 513 changes a set value of Win in accordance with the state of vehicle 50. Charging restriction unit 513 may determine the set value of Win based on a temperature of battery 130. Charging restriction unit 513 may decrease the set value of Win as a degree of deterioration over time of battery 130 is higher. Charging restriction unit 513 may decrease the set value of Win as a degree of high-rate deterioration of battery 130 is higher. Charging restriction unit 513 may determine the set value of Win in consideration of protection of a component that conducts when battery 130 is charged.

Obtaining unit 511 is configured to obtain pricing information. Pricing information is information indicating pricing of a power feed facility. The pricing indicated by the pricing information may be categorized into time-based pricing (that is, the pricing that a fee is charged based on a charging time period), usage-based pricing (that is, the pricing that a fee is charged based on an amount of electric power for charging), and flat-rate pricing (that is, the pricing that a fee for one charging is flat). In this embodiment, information indicating whether the pricing of the power feed facility falls under time-based pricing, usage-based pricing, or flat-rate pricing is adopted as the pricing information. Obtaining unit 511 obtains such pricing information.

Obtaining unit 511 may obtain the pricing information of EVSE 40 from EVSE 40 by communication with EVSE 40 through communication equipment 180. Obtaining unit 511 may request a user to give pricing information of EVSE 40. Obtaining unit 511 may obtain the pricing information of EVSE 40 from the user by receiving an input from the user onto input apparatus 161. Alternatively, when the user enters pricing information of EVSE 40 onto portable terminal 80, the entered pricing information may be transmitted from portable terminal 80 to vehicle 50. Obtaining unit 511 may request server 30 to give pricing information of EVSE 40. Server 30 may obtain pricing information of EVSE 40 in response to a request from obtaining unit 511 and transmit the obtained pricing information of EVSE 40 to vehicle 50. Server 30 may include a database that manages information on the power feed facility.

Determination unit 512 is configured to determine whether or not restriction of charging power for battery 130 is severer than a prescribed level. Determination unit 512 according to this embodiment determines that restriction of charging power is severer than the prescribed level when Win is smaller than a prescribed first threshold value (which is denoted as a "threshold value X1" below) and determines that restriction of charging power is not severer than the prescribed level when Win is larger than threshold value X1. Threshold value X1 is stored in advance in storage 153.

First charging manager 521 is configured to set the charging quitting condition described previously. The charging quitting condition according to this embodiment is satisfied when the SOC of battery 130 is equal to or higher than a prescribed second threshold value (which is denoted as a "threshold value X2" below). Threshold value X2 is stored in storage 153. Initial threshold value X2 may be set to 90%. Though details will be described later, first charging manager 521 changes threshold value X2 when a prescribed condition for change is satisfied. The charging quitting condition according to this embodiment is satisfied also when ECU 150 receives a stop instruction from the user during charging. The user can send a stop instruction to ECU 150 through input apparatus 161 or portable terminal 80 (FIG. 2). When the charging quitting condition is satisfied, external charging of battery 130 carried out by charging control unit 550 ends. In external charging of battery 130 by using the power feed facility, when the pricing of the power feed facility indicated by the pricing information obtained by obtaining unit 511 falls under time-based pricing and determination unit 512 determines that restriction of charging power is severer than a prescribed level, first charging manager 521 changes the charging quitting condition to move end of external charging ahead. At this time, first charging manager 521 moves end of external charging ahead by decreasing threshold value X2.

First charging manager 521 is configured to set the charging quitting condition such that battery 130 is charged with electric power in an amount necessary for vehicle 50 to reach a prescribed location (which is also referred to as a "location Y" below). An amount of electric power necessary for vehicle 50 to reach location Y is also referred to as an "amount of electric power for reaching" below. First charging manager 521 applied to the PHV may find the amount of electric power for reaching in consideration of a distance over which the PHV can travel with the engine (that is, a distance that correlates with a remaining amount of fuel). As the distance over which the PHV can travel with the engine is longer, the amount of electric power for reaching of the PHV is smaller.

Second charging manager 522 sets location Y based on a destination of vehicle 50. The user sets the destination of vehicle 50 in NAVI 170. Second charging manager 522 obtains the destination of vehicle 50 from NAVI 170. A specific example of location Y will be described later (see FIG. 6).

In external charging of battery 130 by using the power feed facility, when the pricing of the power feed facility indicated by the pricing information obtained by obtaining unit 511 falls under flat-rate pricing and determination unit 512 determines that restriction of charging power is not severer than the prescribed level (for example, YES in S31 in FIG. 10 which will be described later), first charging manager 521 changes the charging quitting condition to extend the charging time period. At this time, first charging manager 521 extends the charging time period by increasing threshold value X2.

Notification unit 514 is configured to give information on charging to the user. Specifically, notification unit 514 is configured to control, in external charging of battery 130 by using the power feed facility, meter panel 162 to notify the user of a waiting time until external charging is completed when the pricing of the power feed facility indicated by the pricing information obtained by obtaining unit 511 falls under pricing other than time-based pricing (in this embodiment, usage-based pricing or flat-rate pricing) and determination unit 512 determines that restriction of charging power is severer than the prescribed level (for example, NO in S21 in FIG. 8 which will be described later and NO in S31 in FIG. 10). Notification unit 514 may control any notification device, without being limited to meter panel 162. Notification unit 514 may request portable terminal 80 to give a notification of the waiting time.

Figure 4:
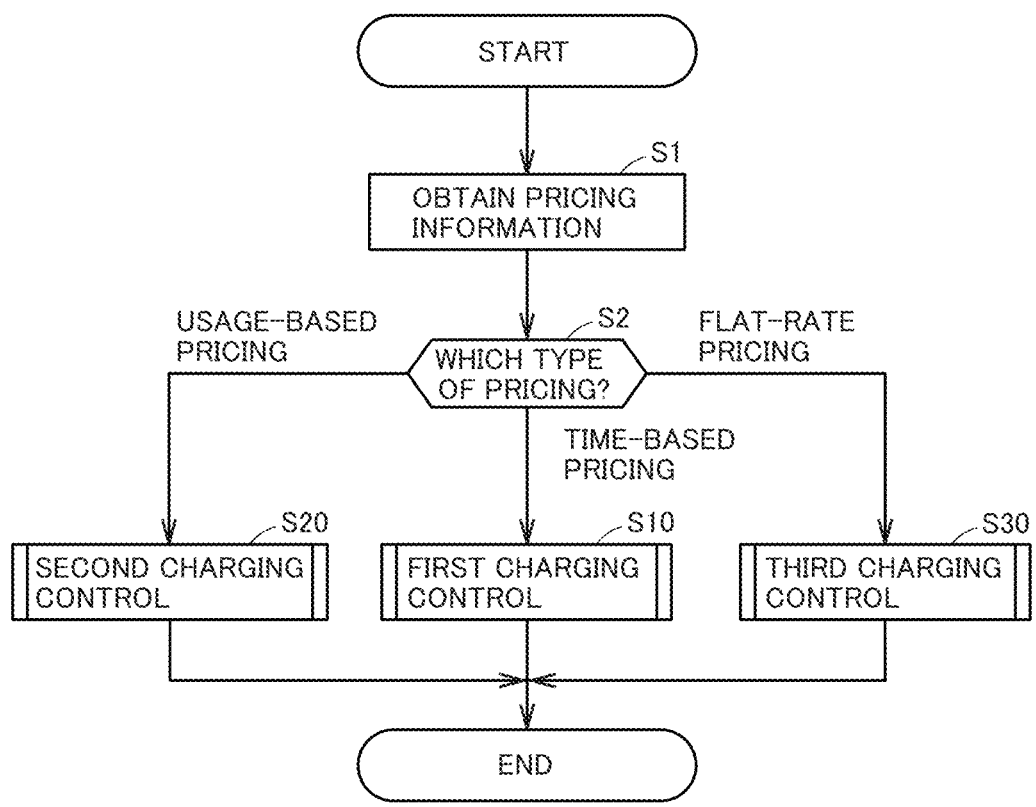
FIG. 4 is a flowchart showing processing involved with charging control carried out by the charging controller according to the first embodiment of the present disclosure.

FIG. 4 is a flowchart showing processing involved with charging control carried out by ECU 150 of vehicle 50. Processing shown in this flowchart is started, for example, when preparation for external charging of battery 130 by using EVSE 40 (FIG. 2) is completed.

Referring to FIG. 4 together with FIGS. 1 to 3, in step (which is simply denoted as "S" below) 1, obtaining unit 511 obtains pricing information of EVSE 40 and has the obtained pricing information stored in storage 153.

In S2, first charging manager 521 determines whether the pricing of EVSE 40 falls under time-based pricing, usage-based pricing, or flat-rate pricing. First charging manager 521 makes determination in S2 based on pricing information of EVSE 40 stored in storage 153 in S1.

When determination as time-based pricing is made in S2, in S10, ECU 150 carries out first charging control. When determination as usage-based pricing is made in S2, in S20, ECU 150 carries out second charging control. When determination as flat-rate pricing is made in S2, in S30, ECU 150 carries out third charging control.

Figure 5:
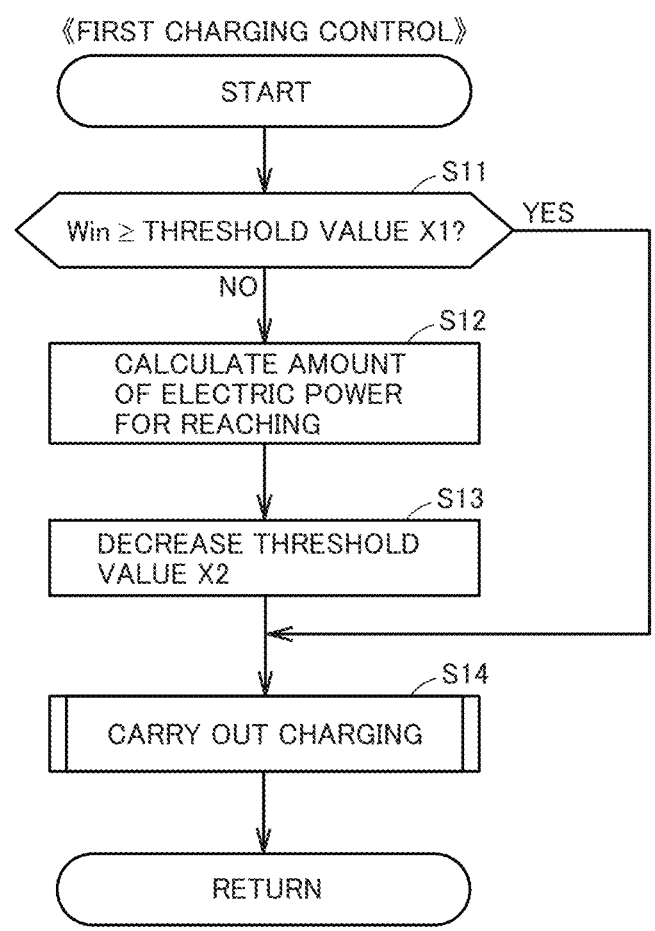
FIG. 5 is a flowchart showing processing involved with first charging control shown in FIG. 4.

FIG. 5 is a flowchart showing processing involved with first charging control carried out in S10 in FIG. 4 in the first embodiment. Processing shown in this flowchart is performed when the pricing of EVSE 40 falls under time-based pricing.

Referring to FIG. 5 together with FIGS. 1 to 3, in S11, determination unit 512 determines whether or not Win is equal to or larger than threshold value X1. When Win is equal to or larger than threshold value X1 (YES in S11), the process proceeds to S14. When Win is not set as well, determination as YES is made in S11. Determination as YES in S11 means that restriction of charging power is not severer than the prescribed level. When Win is smaller than threshold value X1 (NO in S11), the process proceeds to S12. Determination as NO in S11 means that restriction of charging power is severer than the prescribed level. In the example shown in FIG. 5, determination as YES is made in S11 when Win is equal to threshold value X1. Without being limited as such, determination as NO may be made in S11 when Win is equal to threshold value X1.

Figure 6:
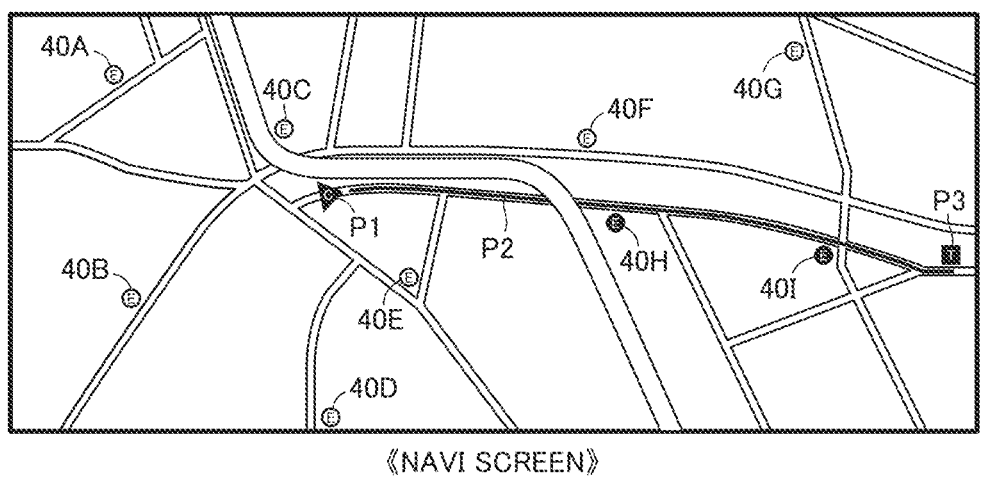
FIG. 6 is a diagram for illustrating processing for calculating an amount of electric power for reaching in first charging control shown in FIG. 5.

In S12, first charging manager 521 finds the amount of electric power for reaching. FIG. 6 is a diagram for illustrating processing in S12. A screen shown in FIG. 6 is a navigation screen (which is referred to as a "navi screen" below) shown by NAVI 170.

Referring to FIG. 6, the navi screen shows a map around vehicle 50. On the map, a current position P1 of vehicle 50 and EVSE 40A to EVSE 40I present around vehicle 50 are shown. As the user sets a destination P3 of vehicle 50 in NAVI 170, a travel route P2 for vehicle 50 to reach destination P3 from current position P1 is shown on the navi screen.

The amount of electric power for reaching found in S12 in FIG. 5 is an amount of electric power necessary for vehicle 50 to reach location Y. In this embodiment, second charging manager 522 sets EVSE present on travel route P2 as location Y. In the navi screen shown in FIG. 6, EVSE 40H and EVSE 40I among EVSE 40A to EVSE 40I are present on travel route P2. Second charging manager 522 sets closest EVSE on travel route P2 (that is, EVSE 40H closest to current position P1 on travel route P2) as location Y. In S12, first charging manager 521 finds the amount of electric power for reaching (that is, the amount of electric power necessary for vehicle 50 to reach EVSE 40H) based on electric power consumption (an electric power consumption rate) of vehicle 50 and a distance from current position P1 to EVSE 40H.

When second charging manager 522 selects location Y from among a plurality of pieces of EVSE present on travel route P2, it may select location Y in consideration of a distance from current position P1 to each piece of EVSE and a charge fee of each piece of EVSE. Second charging manager 522 may exclude EVSE far from current position P1 and EVSE high in charge fee from candidates for location Y. Alternatively, second charging manager 522 may exclude EVSE of the time-based pricing from candidates for location Y. The candidate for location Y is not limited to EVSE. Second charging manager 522 may set destination P3 as location Y.

Referring again to FIG. 5 together with FIGS. 1 to 3, after processing in S12, in S13, first charging manager 521 decreases threshold value X2. For example, first charging manager 521 changes threshold value X2 from 90% (initial value) to a value lower than 90%. Threshold value X2 is a parameter that defines the charging quitting condition. As threshold value X2 is smaller, external charging tends to end earlier (see S53 in FIG. 7 which will be described later). Decrease in threshold value X2 means change of the charging quitting condition to move end of external charging ahead. In this embodiment, first charging manager 521 changes threshold value X2 to an SOC value corresponding to the amount of electric power for reaching. A margin may be set for the amount of electric power for reaching. First charging manager 521 may change threshold value X2 to an SOC value calculated by adding the margin to the SOC value corresponding to the amount of electric power for reaching.

Figure 7:
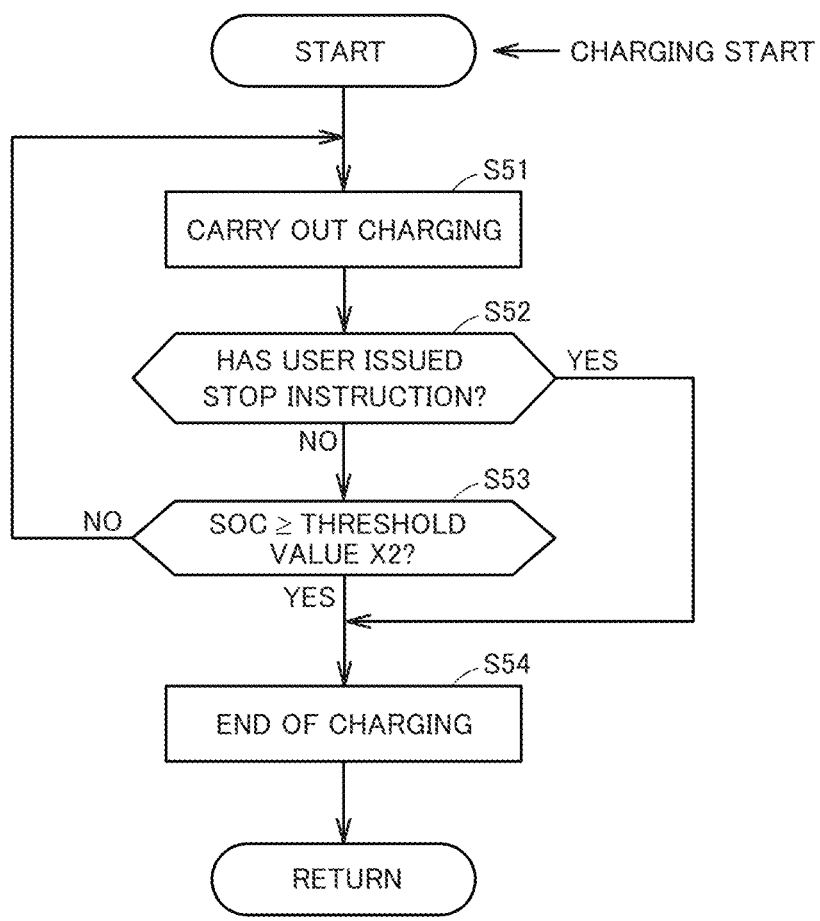
FIG. 7 is a flowchart showing details of processing involved with charging carried out in first charging control shown in FIG. 5.

In S14, charging control unit 550 carries out external charging of battery 130 by using EVSE 40. When Win is smaller than threshold value X1 (NO in S11), threshold value X2 is changed in S13, and thereafter charging is started in S14. When Win is equal to or larger than threshold value X1 (YES in S11), charging is started in S14 without threshold value X2 being changed. FIG. 7 is a flowchart showing details of processing in S14.

Referring to FIG. 7 together with FIGS. 1 to 3, in S51, charging control unit 550 carries out external charging of battery 130 by controlling charger 120. Then, charging control unit 550 determines whether or not a prescribed charging quitting condition is satisfied in S52 and S53 which will be described below.

In S52, charging control unit 550 determines whether or not ECU 150 receives a stop instruction from a user during charging.

In S53, charging control unit 550 determines whether or not the SOC of battery 130 is equal to or higher than threshold value X2.

While determination as NO is made in both of S52 and S53, the charging quitting condition is not satisfied. Therefore, the process returns to S51 and external charging of battery 130 is continued. When determination as YES is made in any of S52 and S53, in S54, charging control unit 550 requests EVSE 40 to stop transmission of electric power and controls charger 120 to stop charging. As processing in S54 is performed, a series of processing shown in FIGS. 7 and S14 in FIG. 5 end. Furthermore, as S14 in FIG. 5 ends, S10 in FIG. 4 ends and a series of processing shown in FIG. 4 also ends. As the processing in FIG. 4 ends, threshold value X2 returns to the initial value.

Figure 8:
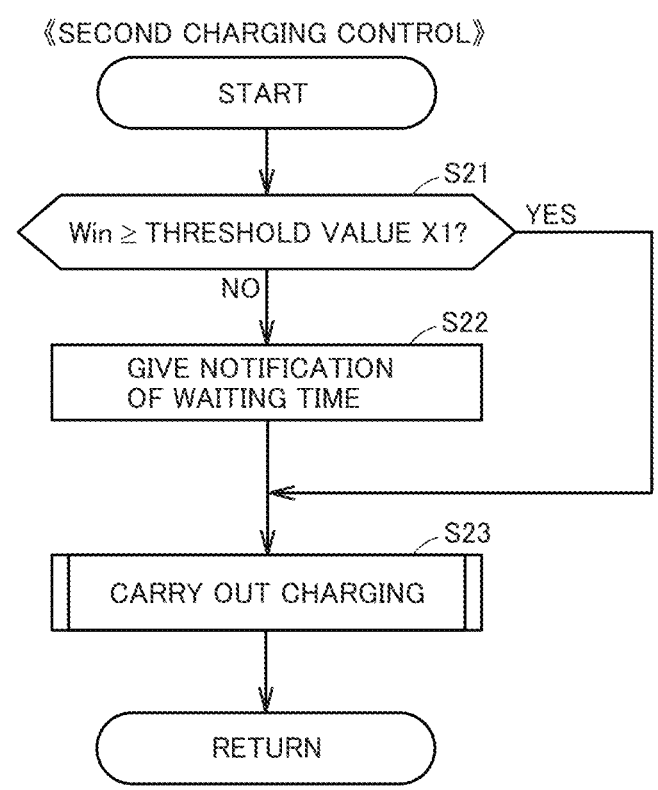
FIG. 8 is a flowchart showing processing involved with second charging control shown in FIG. 4.

FIG. 8 is a flowchart showing processing involved with second charging control performed in S20 in FIG. 4. Processing shown in this flowchart is performed when the pricing of EVSE 40 falls under usage-based pricing.

Referring to FIG. 8 together with FIGS. 1 to 3, in S21, determination unit 512 determines whether or not Win is equal to or larger than threshold value X1. In S21, processing as in S11 in FIG. 5 is performed. When Win is equal to or larger than threshold value X1 (YES in S21), the process proceeds to S23. In S23, as in S14 in FIG. 5, the series of processing shown in FIG. 7 is performed. As S23 (the series of processing shown in FIG. 7) ends, S20 in FIG. 4 ends and the series of processing shown in FIG. 4 also ends.

Figure 9:
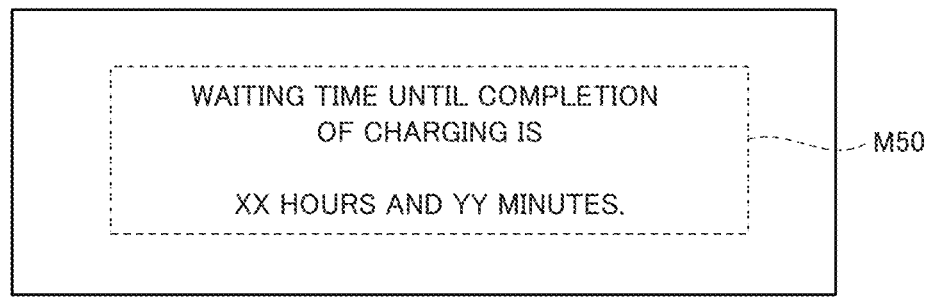
FIG. 9 is a diagram for illustrating processing for giving a notification of a waiting time in second charging control shown in FIG. 8.

When Win is smaller than threshold value X1 (NO in S21), the process proceeds to S22. In S22, notification unit 514 controls meter panel 162 to notify the user of a waiting time until external charging is completed. FIG. 9 is a diagram for illustrating processing in S22.

Referring to FIG. 9, in S22 in FIG. 8, meter panel 162 shows a notification screen including a message M50. Message M50 informs the user of the waiting time until completion of external charging.

Referring again to FIG. 8 together with FIGS. 1 to 3, as processing in S22 is performed, in S23, external charging of battery 130 by using EVSE 40 is started. When Win is smaller than threshold value X1, restriction of charging power is severe, and hence it is estimated that charging proceeds slowly and a time period for which the user waits for completion of charging is long. Through processing in S22, however, the user can know the waiting time and hence the user tends to effectively use the waiting time. When the waiting time is too long for the user, the user can stop charging by sending a stop instruction (see S52 in FIG. 7) to ECU 150. Meter panel 162 may show the notification screen (see FIG. 9) described previously during charging. Notification unit 514 may update the waiting time shown on meter panel 162 in accordance with progress of charging.

Figure 10:
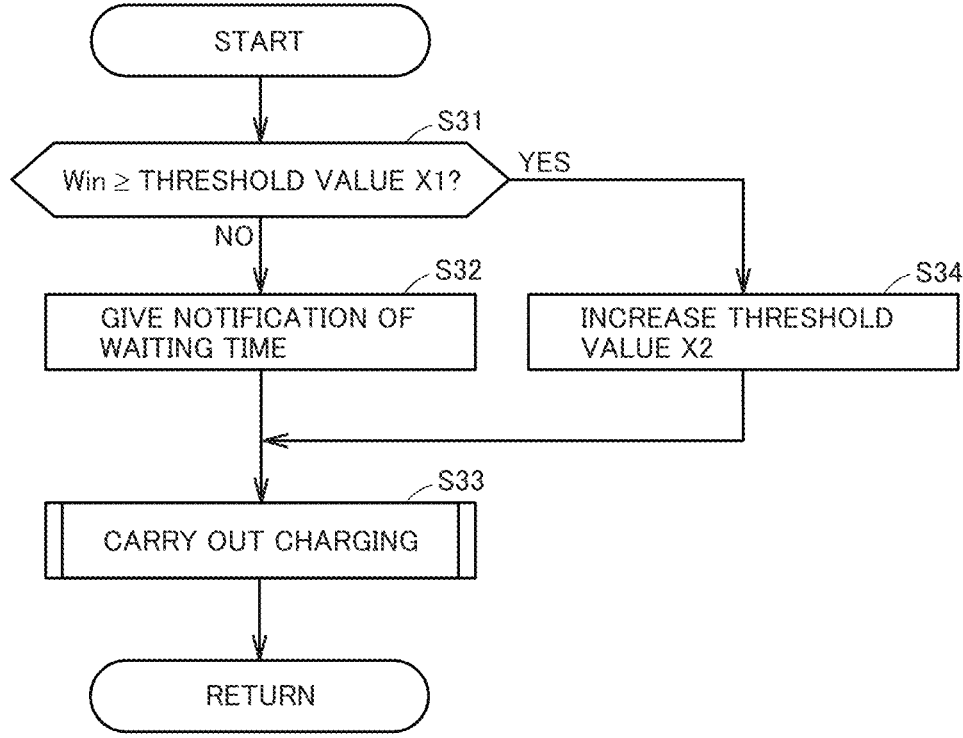
FIG. 10 is a flowchart showing processing involved with third charging control shown in FIG. 4.

FIG. 10 is a flowchart showing processing involved with third charging control performed in S30 in FIG. 4. Processing shown in this flowchart is performed when the pricing of EVSE 40 falls under flat-rate pricing.

Referring to FIG. 10 together with FIGS. 1 to 3, in S31, determination unit 512 determines whether or not Win is equal to or larger than threshold value X1. In S31, processing as in S11 in FIG. 5 is performed. When Win is smaller than threshold value X1 (NO in S31), the process proceeds to S32. In S32, processing as in S22 in FIG. 8 is performed. When Win is equal to or larger than threshold value X1 (YES in S31), the process proceeds to S34.

In S34, first charging manager 521 increases threshold value X2. For example, first charging manager 521 changes threshold value X2 from 90% (initial value) to a value higher than 90%. In this embodiment, first charging manager 521 changes threshold value X2 to 100%. As threshold value X2 is larger, a time period until completion of charging is longer (see S53 in FIG. 7). Increase in threshold value X2 means change of the charging quitting condition to extend the charging time period.

As processing in S32 or S34 is performed, in S33, external charging of battery 130 by using EVSE 40 is started. In S33, as in S14 in FIG. 5, the series of processing shown in FIG. 7 is performed. As S33 (the series of processing shown in FIG. 7) ends, S30 in FIG. 4 ends and the series of processing shown in FIG. 4 also ends.

As described above, in charging of battery 130 by using the power feed facility, when the pricing of the power feed facility falls under time-based pricing and charging power for battery 130 is restricted more severely than the prescribed level, ECU 150 according to this embodiment changes the charging quitting condition to move end of charging ahead (see FIGS. 4 to 7). Under such control, an excessively high fee for charging in charging by using the power feed facility of the time-based pricing can be suppressed. ECU 150 can thus carry out appropriate charging control in accordance with the pricing of the power feed facility.

[Second Embodiment]

A charging controller (an ECU 150A) according to a second embodiment of the present disclosure will be described. Since the second embodiment is mostly identical to the first embodiment, differences will mainly be described and description of components in common is not provided.

Figure 11:
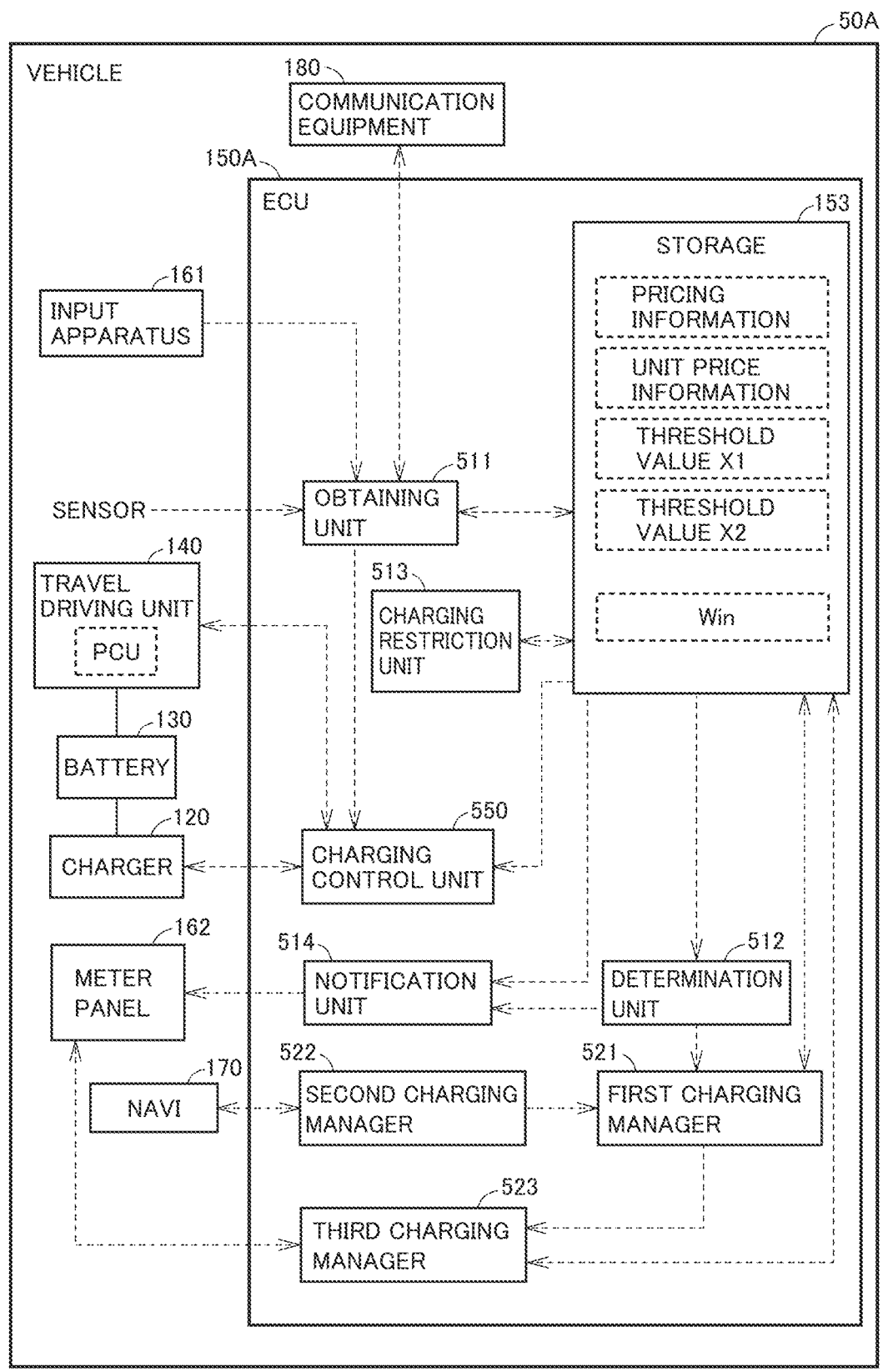
FIG. 11 is a diagram showing a detailed configuration of a charging controller according to a second embodiment of the present disclosure.

FIG. 11 is a diagram showing a detailed configuration of ECU 150A mounted on a vehicle 50A according to the second embodiment.

Referring to FIG. 11, vehicle 50A according to the second embodiment is configured similarly to vehicle 50 (FIGS. 1 to 3) according to the first embodiment except for including ECU 150A instead of ECU 150 (FIG. 3). ECU 150A further includes a third charging manager 523 in addition to components of ECU 150 shown in FIG. 3.

Third charging manager 523 is configured to prohibit change of the charging quitting condition. More specifically, third charging manager 523 according to this embodiment is configured to request, in charging of battery 130 by using the power feed facility, a user to provide an input indicating whether or not to permit change of the charging quitting condition (for example, S15 in FIG. 12 which will be described later) when the pricing of the power feed facility indicated by the pricing information obtained by obtaining unit 511 falls under time-based pricing and determination unit 512 determines that restriction of charging power is severer than the prescribed level (for example, NO in S11 in FIG. 12 which will be described later) and to prohibit change of the charging quitting condition in response to reception of the input indicating prohibition from the user. In this embodiment, third charging manager 523 requests the user to provide an input through meter panel 162. Third charging manager 523, however, may do so through portable terminal 80 instead of meter panel 162.

Obtaining unit 511 is configured to obtain unit price information indicating a unit price of the charge fee. For example, unit price information of time-based pricing indicates a price per unit time. Unit price information of usage-based pricing indicates a price per unit amount of electric power. Obtaining unit 511 may obtain unit price information of EVSE 40 from EVSE 40, a user, or server 30. The unit price information obtained by obtaining unit 511 is stored in storage 153.

Figure 12:
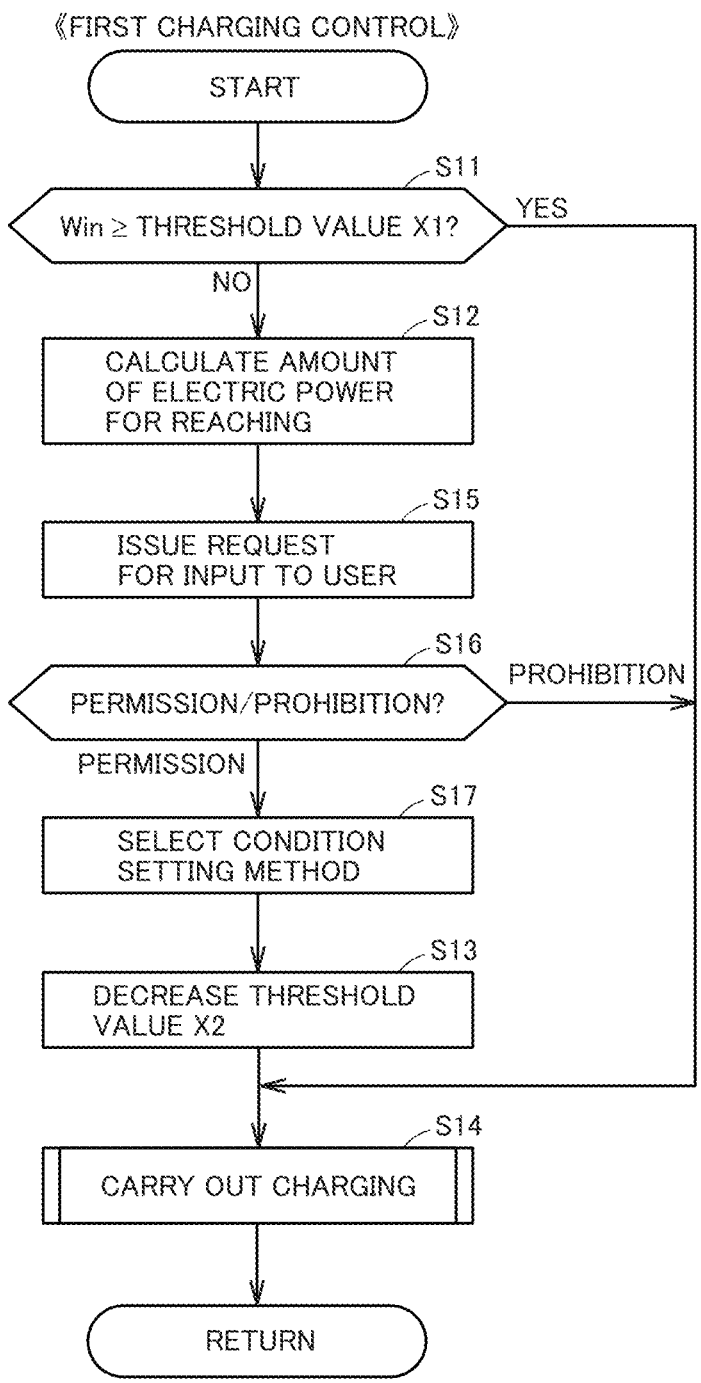
FIG. 12 is a flowchart showing processing involved with first charging control in the second embodiment.

In S10 in FIG. 4, ECU 150A performs a series of processing shown in FIG. 12 instead of the series of processing shown in FIG. 5. FIG. 12 is a flowchart showing processing involved with first charging control performed in S10 in FIG. 4. Processing shown in this flowchart is performed when the pricing of EVSE 40 falls under time-based pricing. Since S11 to S14 in FIG. 12 are the same as S11 to S14 in FIG. 5, description thereof will not be provided.

Figure 13:
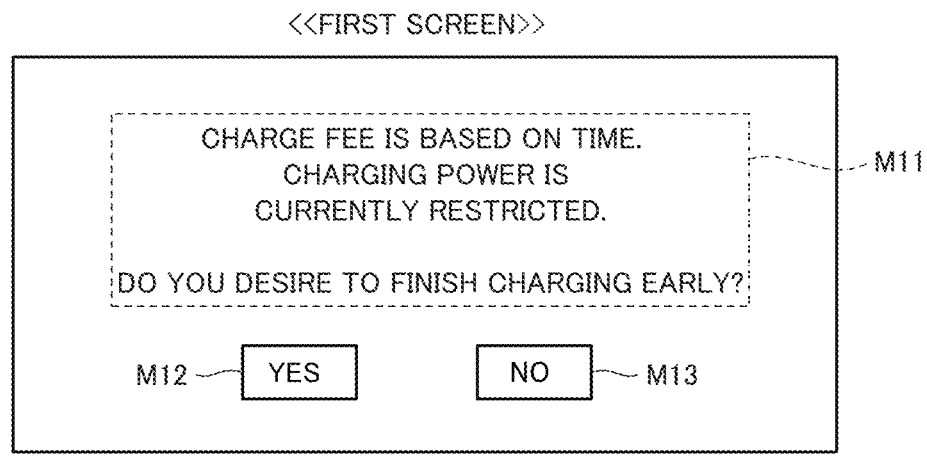
FIG. 13 is a diagram for illustrating processing for issuing to a user, a request to provide an input indicating whether or not to permit change of a charging quitting condition in first charging control shown in FIG. 12.

Referring to FIG. 12 together with FIG. 11, when Win is smaller than threshold value X1 (NO in S11), the amount of electric power for reaching is calculated in S12. Thereafter, the process proceeds to S15. In S15, third charging manager 523 requests a user to provide an input indicating whether or not to permit change of the charging quitting condition. Third charging manager 523 requests the user to provide the input, for example, by having meter panel 162 show a first screen shown in FIG. 13. FIG. 13 is a diagram for illustrating processing in S15.

Referring to FIG. 13, the first screen includes a message M11, a "YES" button MU, and a "NO" button M13. Message M11 informs a user of a situation and requests the user to provide an input indicating whether or not to permit change of the charging quitting condition. The user can select any of "YES" button M12 and "NO" button M13 by operating an operation portion (for example, a cursor key and an enter button which are not shown) of meter panel 162. Selection of "YES" button M12 by the user means that the user provides an input indicating permission to third charging manager 523. Selection of "NO" button M13 by the user means that the user provides an input indicating prohibition to third charging manager 523. When the user has made setting to prohibit change of the charging quitting condition in ECU 150A in advance, "NO" button M13 may automatically be selected.

Figure 14:
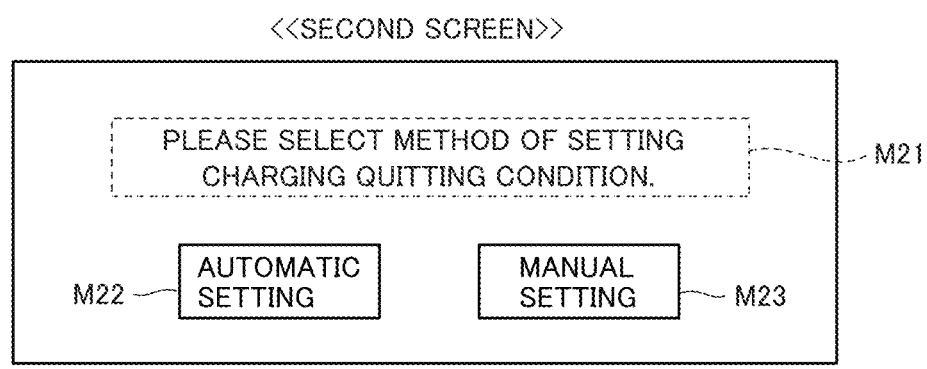
FIG. 14 is a diagram for illustrating processing for requesting a user to select a method of setting the charging quitting condition in first charging control shown in FIG. 12.

Referring again to FIG. 12 together with FIG. 11, in S16, third charging manager 523 determines whether or not it has received an input indicating any of permission and prohibition from the user. When "NO" button M13 (FIG. 13) is selected (S16: prohibition), third charging manager 523 prohibits change of the charging quitting condition. Specifically, third charging manager 523 has the process proceed to S14 such that first charging manager 521 is not allowed to perform processing in S13 which will be described later. When "YES" button M12 (FIG. 13) is selected (S16: permission), the process proceeds to S17. In S17, third charging manager 523 requests the user to select a method of setting the charging quitting condition. Third charging manager 523 requests the user to make selection above, for example, by having meter panel 162 show a second screen shown in FIG. 14. FIG. 14 is a diagram for illustrating processing in S17.

Referring to FIG. 14, the second screen includes a message M21, an "automatic setting" button M22, and a "manual setting" button M23. Message M21 requests the user to select a setting method. Selection of "automatic setting" button M22 by the user means that the user desires automatic setting. Selection of "manual setting" button M23 by the user means that the user desires manual setting. When a prescribed time period elapses since the second screen was shown without selection being made by the user, "automatic setting" button M22 may automatically be selected.

Figure 15:
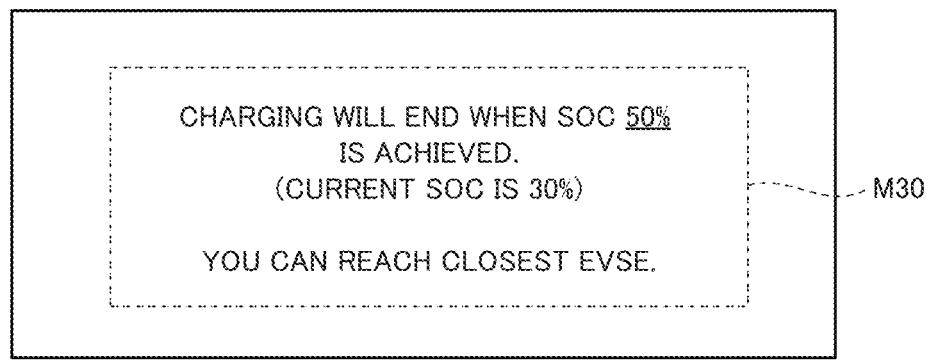
FIG. 15 is a diagram showing an exemplary screen shown when the charging quitting condition is automatically set in first charging control shown in FIG. 12.

Referring again to FIG. 12 together with FIG. 11, when "automatic setting" button M22 (FIG. 14) is selected (S17: automatic setting), threshold value X2 is automatically set, and in S13, first charging manager 521 decreases threshold value X2. In this embodiment, first charging manager 521 determines threshold value X2 based on the amount of electric power for reaching. More specifically, first charging manager 521 changes threshold value X2 to an SOC value (for example, 50%) corresponding to the amount of electric power for reaching. At this time, third charging manager 523 may have meter panel 162 show a third screen shown in FIG. 15. FIG. 15 is a diagram showing an exemplary screen shown when the charging quitting condition (for example, threshold value X2) is automatically set.

Referring to FIG. 15, the third screen includes a message M30. Message M30 informs a user of the changed charging quitting condition (threshold value X2=50%). Threshold value X2 corresponds to the SOC value at the time of end of charging. In the third screen shown in FIG. 15, message M30 informs the user of an SOC value (current SOC) at the time of start of charging, together with the SOC value (threshold value X2) at the time of end of charging. In the example shown in FIG. 15, the current SOC is 30%. Message M30 also informs the user that vehicle 50A can reach the closest EVSE as battery 130 is charged such that the SOC thereof attains to changed threshold value X2 (50%).

Figure 16:
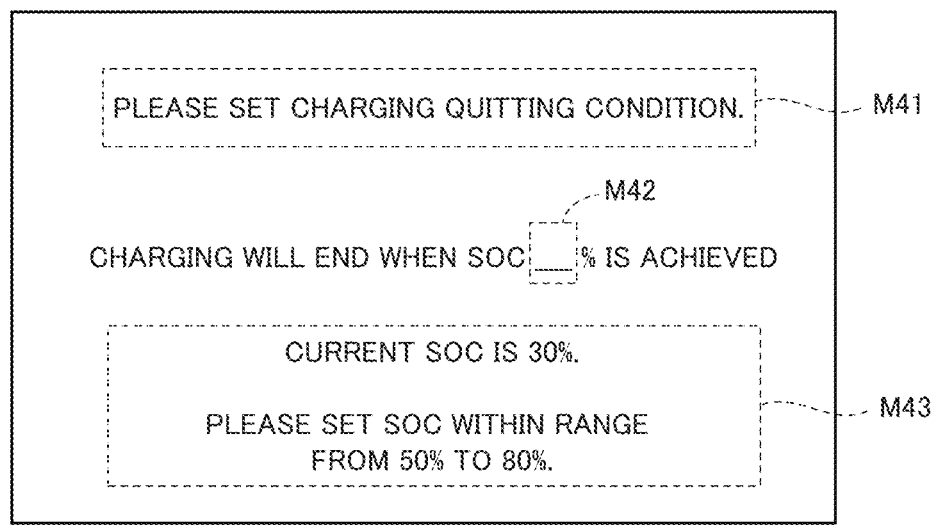
FIG. 16 is a diagram showing an exemplary screen shown when the charging quitting condition is manually set in first charging control shown in FIG. 12.

Referring again to FIG. 12 together with FIG. 11, when "manual setting" button M23 (FIG. 14) is selected (S17: manual setting), in S13, third charging manager 523 has meter panel 162 show a fourth screen shown in FIG. 16. FIG. 16 is a diagram showing an exemplary screen shown when the charging quitting condition (for example, threshold value X2) is manually set.

Referring to FIG. 16, the fourth screen includes messages M41 and M43 and an input field M42. Message M41 requests a user to set the charging quitting condition.

Input field M42 accepts an input of threshold value X2 from the user.

The user can enter a numeric value in input field M42 by operating the operation portion (for example, a cursor key and an enter button which are not shown) of meter panel 162. In this embodiment, first charging manager 521 restricts a range of numeric values that can be entered in input field M42 so as to move end of external charging ahead. The range of numeric values that can be entered in input field M42 is, for example, a range from a first SOC value to a second SOC value. The first SOC value corresponds to an SOC value corresponding to the amount of electric power for reaching. The second SOC value corresponds to an SOC value at the time when the charge fee reaches a prescribed upper limit price. First charging manager 521 may calculate the second SOC value based on unit price information, the current SOC, and Win. First charging manager 521 sets the second SOC value to a value smaller than current threshold value X2 (for example, 90%). In the example shown in FIG. 16, the first SOC value is set to 50% and the second SOC value is set to 80%.

Message M43 informs the user of the SOC value at the time of start of charging (the current SOC) together with the range of numeric values that can be entered in input field M42. In the example shown in FIG. 16, the current SOC is 30%.

First charging manager 521 changes threshold value X2 to the numeric value entered in input field M42 by the user. In S13, first charging manager 521 decreases threshold value X2 in any of the case where threshold value X2 is automatically set (S17: automatic setting) and the case where threshold value X2 is manually set (S17: manual setting). Thereafter, charging is started in S14.

As described above, the charging controller (ECU 150A) according to this embodiment includes third charging manager 523 described above. Therefore, when charging power for battery 130 is restricted more severely than the prescribed level in charging by using the power feed facility of the time-based pricing, the user can select whether or not to move end of charging ahead. The user can suppress the excessively high fee for charging by permitting change of the charging quitting condition. The user can also bring battery 130 to a fully charged state by prohibiting change of the charging quitting condition.

[Another Embodiment]

In the first and second embodiments, unless the charging quitting condition (for example, threshold value X2) is changed in first or third charging control (see FIGS. 5, 10, and 12), the initial condition is maintained as the charging quitting condition. The charging quitting condition, however, may be changed also from another point of view, in addition to a point of view of severity of restriction of charging power. For example, threshold value X2 may variably be set in accordance with a prescribed map. Then, in S13 in FIG. 5 or 12, first charging manager 521 may change threshold value X2 to a value smaller than the current value.

Figure 17:
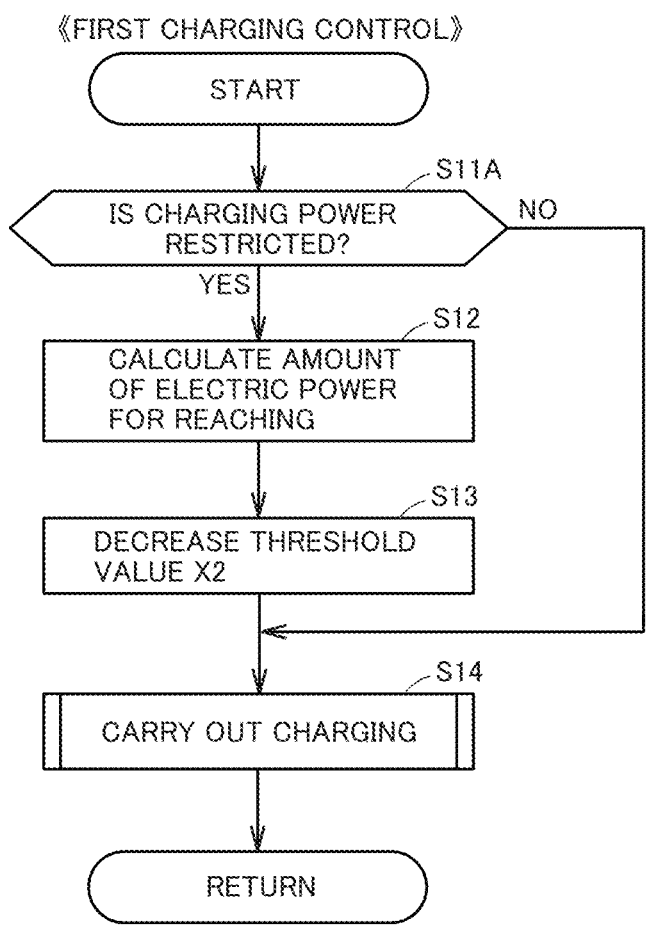
FIG. 17 is a flowchart showing a modification of the processing shown in FIG. 5.

When charging restriction unit 513 has set Win, determination unit 512 may determine that restriction of charging power is severer than the prescribed level, and when charging restriction unit 513 has not set Win, determination unit 512 may determine that restriction of charging power is not severer than the prescribed level. FIG. 17 is a flowchart showing a modification of the processing shown in FIG. 5. Since S12 to S14 in FIG. 17 are the same as S12 to S14 shown in FIG. 5, description thereof will not be provided.

Referring to FIG. 17, in S11A, determination unit 512 determines whether or not Win has been set. When Win has been set (YES in S11A), the process proceeds to S12. When Win has not been set (NO in S11A), the process proceeds to S14. In the charging controller in which charging restriction unit 513 uses a plurality of types of Win to restrict charging power for battery 130, in S11A, determination unit 512 may determine whether or not prescribed Win has been set. For example, in a charging controller in which first Win for protecting battery 130 and second Win for protecting peripheral components around battery 130 are adopted, in S11A, determination unit 512 may determine whether or not second Win has been set.

In the first and second embodiments, first charging manager 521 moves end of external charging ahead by decreasing threshold value X2 for the SOC of battery 130. A method of moving end of external charging ahead, however, can be modified as appropriate. The charging quitting condition may be satisfied when a parameter that correlates with an amount of charging is equal to or larger than a prescribed third threshold value (which is denoted as a "threshold value X3" below). First charging manager 521 may move end of charging ahead by decreasing threshold value X3.

Figure 18:
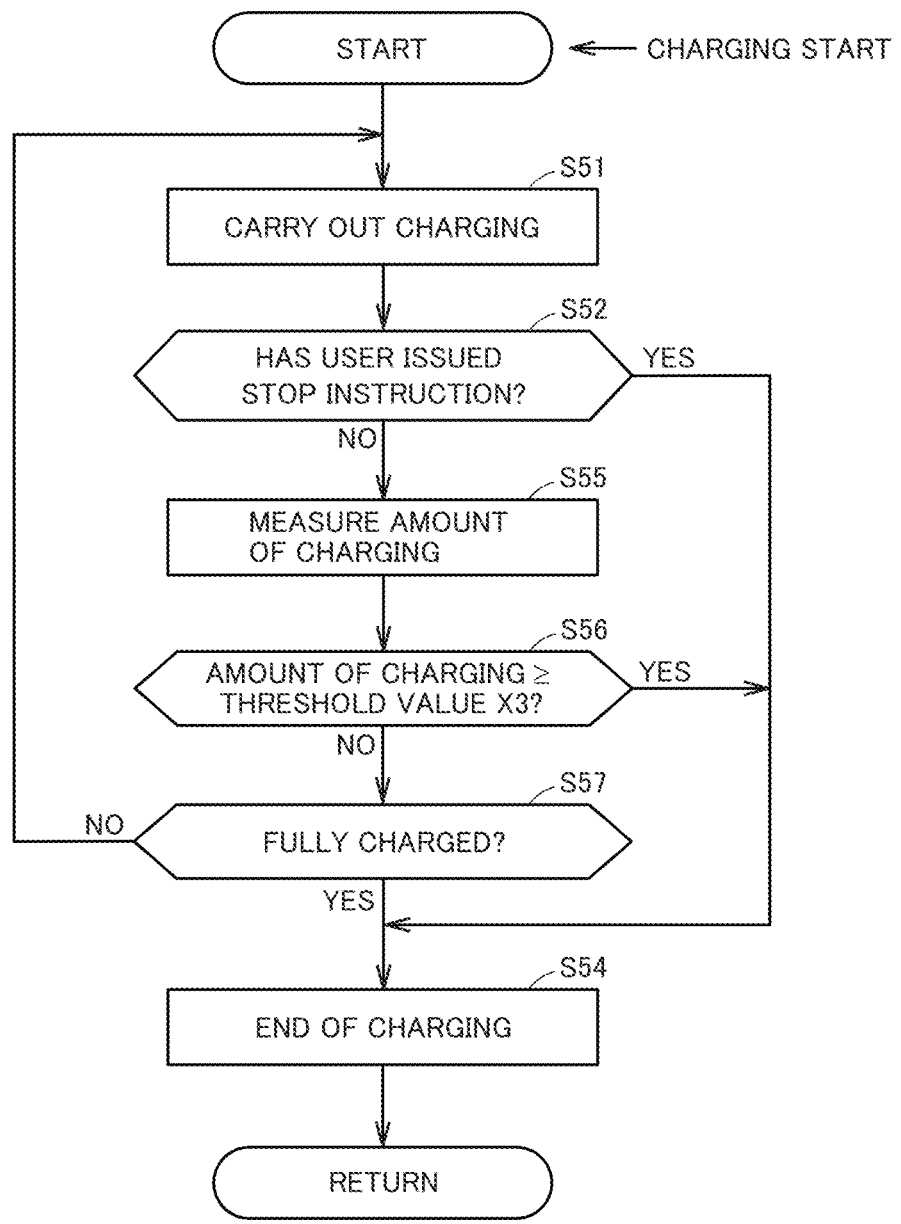
FIG. 18 is a flowchart showing a modification of the processing shown in FIG. 7.

FIG. 18 is a flowchart showing a modification of the processing shown in FIG. 7. Since S51, S52, and S54 in FIG. 18 are the same as S51, S52, and S54 in FIG. 7, description thereof will not be provided. In this modification, in S13 in FIG. 5, first charging manager 521 decreases threshold value X3 instead of threshold value X2. Then, in S14 in FIG. 5, processing shown in FIG. 18 which will be described below is performed instead of the processing shown in FIG. 7.

Referring to FIG. 18, external charging of battery 130 is carried out in S51, and whether or not a prescribed charging quitting condition is satisfied is determined in S52 and S55 to S57.

In S55, charging control unit 550 measures an amount of charging (that is, an amount of input electric power to battery 130 by charging). Charging control unit 550 may find the amount of charging based on an output from monitoring module 121. Thereafter, in S56, charging control unit 550 determines whether or not the amount of charging is equal to or larger than a prescribed amount (threshold value X3).

In S57, charging control unit 550 determines whether or not battery 130 is fully charged. When battery 130 is almost fully charged, forced charging control may be carried out in S51.

While determination as NO is made in all of S52, S56, and S57, the charging quitting condition is not satisfied. Therefore, the process returns to S51 and external charging of battery 130 is continued. When determination as YES is made in any of S52, S56, and S57, charging control unit 550 quits charging in S54.

Figure 19:
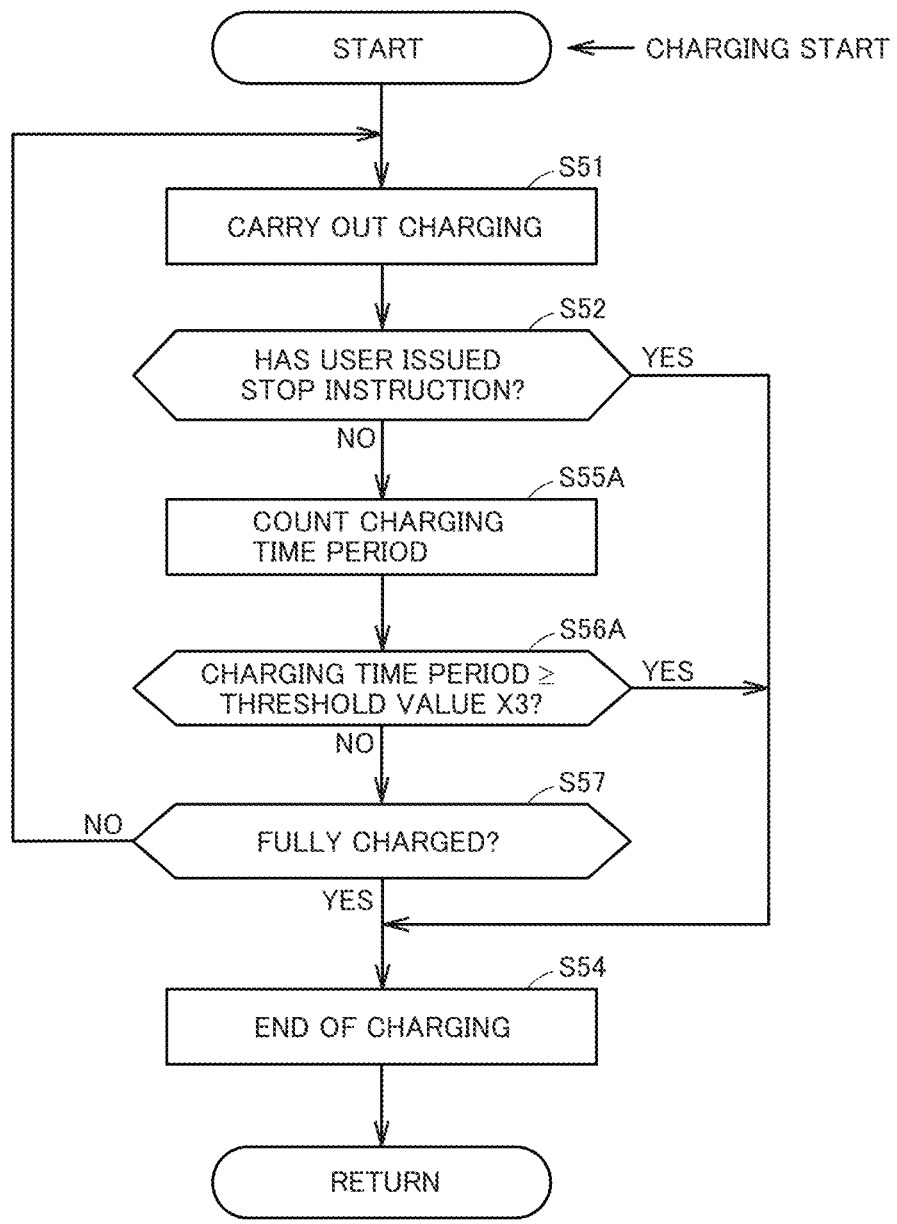
FIG. 19 is a flowchart showing a modification of the processing shown in FIG. 18.

FIG. 19 is a flowchart showing a modification of the processing shown in FIG. 18. Processing shown in FIG. 19 is the same as processing shown in FIG. 18 except for adopting S55A and S56A instead of S55 and S56. S55A and S56A will be described below.

In S55A, charging control unit 550 counts a charging time period (that is, time elapsed since start of charging of battery 130). Charging control unit 550 may count the charging time period with the use of timer 154. In S56A, charging control unit 550 determines whether or not the charging time period is equal to or longer than a prescribed time period (threshold value X3).

Figure 20:
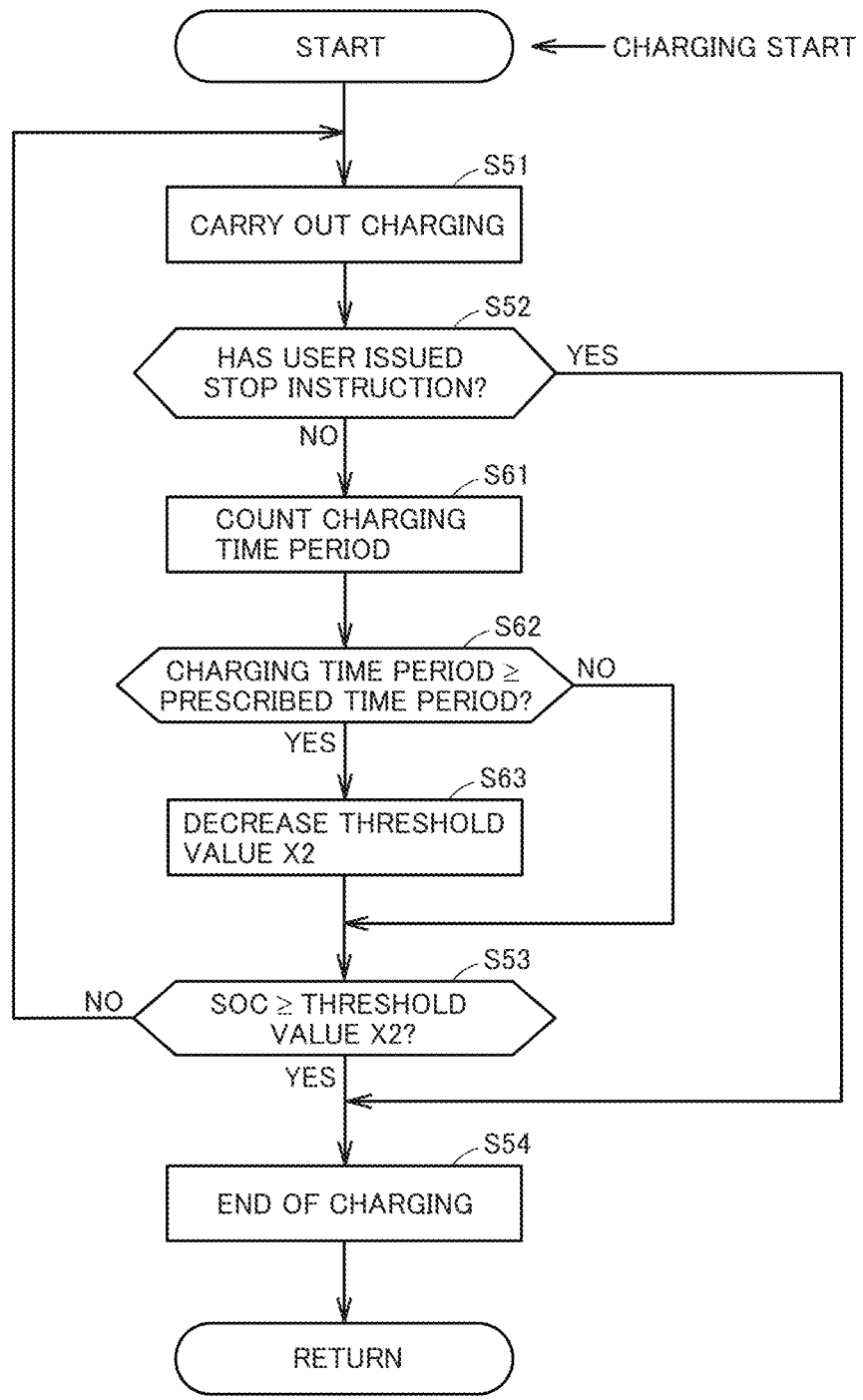
FIG. 20 is a flowchart showing a modification of the processing shown in FIGS. 5 and 7.

In the first and second embodiments, determination unit 512 determines whether or not restriction of charging power is severer than the prescribed level before start of charging. Determination unit 512, however, may determine whether or not restriction of charging power is severer than the prescribed level after charging is started. When charging is not completed in spite of the charging time period reaching the prescribed time period in charging of battery 130 by using the power feed facility, determination unit 512 may determine that restriction of charging power is severer than the prescribed level. FIG. 20 is a flowchart showing a modification of the processing shown in FIGS. 5 and 7. For example, in S10 in FIG. 4, ECU 150 in the first embodiment may perform processing shown in FIG. 20 which will be described below, instead of the processing shown in FIG. 5. In the processing shown in FIGS. 20, S61 to S63 are added to the processing shown in FIG. 5.

Referring to FIGS. 20, S61 to S63 are provided between S52 and S53. In S61, charging control unit 550 counts the charging time period. Charging control unit 550 may count the charging time period with the use of timer 154. In S62, charging control unit 550 determines whether or not the charging time period has reached a prescribed time period (for example, thirty minutes). When the charging time period reaches the prescribed time period (YES in S62), processing in S63 is performed, and thereafter the process proceeds to S53. While the charging time period is shorter than the prescribed time period (NO in S62), the process proceeds to S53 without processing in S63 being performed.

Determination as YES in S62 means that charging is not completed in spite of the charging time period reaching the prescribed time period. When determination as YES is made in S62, determination unit 512 determines that restriction of charging power is severer than the prescribed level. When the charging time period is longer than in a normal case, charging power may be restricted severely. In S63, first charging manager 521 moves end of external charging ahead by decreasing threshold value X2 for the SOC of battery 130.

When the pricing of the power feed facility falls under none of time-based pricing, usage-based pricing, and flat-rate pricing in processing shown in FIG. 4, ECU 150 in the first embodiment may carry out charging through the processing shown in FIG. 7 without carrying out any of first charging control to third charging control (FIGS. 5, 8, and 10). It is not essential to perform the processing shown in FIG. 8 or 10 when the pricing of the power feed facility falls under usage-based pricing or flat-rate pricing in the processing shown in FIG. 4. For example, the processing shown in FIG. 7 may be performed in S20 in FIG. 4 instead of the processing shown in FIG. 8. The processing shown in FIG. 7 may be performed in S30 in FIG. 4 instead of the processing shown in FIG. 10.

A configuration of the vehicle is not limited to the configuration shown in FIG. 1. For example, the vehicle may be configured to be wirelessly chargeable. The vehicle is not limited to a passenger car, and a bus or a truck may be applicable.

At least one of the charging controller and the power storage subjected to charging control by the charging controller may be mounted on transportation means (a ship or an airplane) other than the vehicle, an unmanned mobile body (an automated guided vehicle (AGV), an agricultural implement, a movable robot, or a drone), or a portable terminal carried by a user.

Various modifications may be carried out as being combined in any manner. For example, the charging controller may accept an input from a user so that the user can adopt any charging control. The charging controller (ECU) may be configured such that the user can select any of first charging control shown in FIG. 5, first charging control shown in FIG. 12, and first charging control shown in FIG. 17, through input apparatus 161.

Though embodiments of the present disclosure have been described, it should be understood that the embodiments disclosed herein are illustrative and non-restrictive in every respect. The scope of the present disclosure is defined by the terms of the claims and is intended to include any modifications within the scope and meaning equivalent to the terms of the claims.

What is claimed is:

1. A power management system, comprising:
   a vehicle including a power storage and a charging controller; and
   a server including a database that manages pricing information on each of a plurality of power feed facilities, the server being configured to transmit the pricing information,
   wherein
   each of the plurality of power feed facilities is electrically connected to a power grid,
   the charging controller is configured to:
      carry out charging of the power storage with charging power to be restricted;
      obtain, in the charging of the power storage by using a target power feed facility of the plurality of power feed facilities, the pricing information indicating pricing of the target power feed facility;
      carry out first charging control in response to determining that the pricing of the target power feed facility indicated by the pricing information falls under time-based pricing, the time-based pricing being pricing that a fee is charged based on a charging time period; and
      carry out second charging control in response to determining that the pricing of the target power feed facility indicated by the pricing information falls under usage-based pricing, the usage-based pricing being pricing that a fee is charged based on an amount of electric power for charging;
   the charging controller is further configured to, in the second charging control, quit the charging in response to an SOC of the power storage being equal to or larger than a threshold value while the charging is carried out, and
   the charging controller is further configured to, in the first charging control,
      determine whether restriction of the charging power is severer than a prescribed level,
      upon determining that the restriction of the charging power is not severer than the prescribed level, quit the charging in response to the SOC of the power storage being equal to or larger than the threshold value while the charging is carried out, and
      upon determining that the restriction of the charging power is severer than the prescribed level, quit the charging in response to the SOC of the power storage being equal to or larger than another threshold value while the charging is carried out, the another threshold value being smaller than the threshold value.

2. The power management system according to claim 1, wherein
   the pricing information indicates whether the pricing of the power feed facility falls under the time-based pricing, the usage-based pricing, or flat-rate pricing, the flat-rate pricing being pricing that a fee for one charging is flat.

3. The power management system according to claim 1, wherein
   the charging controller is configured to set an upper limit value of charging power for the power storage, and
   the charging controller is further configured to, in the first charging control,
      in response to the upper limit value of the charging power being smaller than a first threshold value, determine that the restriction of the charging power is severer than the prescribed level, and
      in response to the upper limit value of the charging power being larger than the first threshold value, determine that the restriction of the charging power is not severer than the prescribed level.

4. The power management system according to claim 1, wherein
   the charging controller is configured to set an upper limit value of charging power for the power storage, and
   the charging controller is further configured to, in the first charging control,
      in response to the upper limit value of the charging power being set, determine that the restriction of the charging power is severer than the prescribed level, and
      in response to the upper limit value of the charging power being not set, determine that the restriction of the charging power is not severer than the prescribed level.

5. The power management system according to claim 1, wherein
   the charging controller is configured to, in response to the charging being not completed in spite of the charging time period reaching a prescribed time period in the charging of the power storage by using the target power feed facility, determine that the restriction of the charging power is severer than the prescribed level.

6. The power management system according to claim 1, wherein
   the vehicle is configured to travel with electric power stored in the power storage, and
   the charging controller is configured to set the second charging quitting condition such that the power storage is charged with electric power in an amount necessary for the vehicle to reach a prescribed location.

7. The power management system according to claim 6, wherein the charging controller is configured to
   obtain a destination of the vehicle, and
   set the prescribed location based on the destination, by setting, as the prescribed location, any one of the destination and a power feed facility present on a travel route before the vehicle reaches the destination.

8. The power management system according to claim 1, wherein the vehicle further includes a notification device configured to give information on charging to a user, wherein
   the charging controller is configured to, in the second charging control, determine whether the restriction of charging power is severer than the prescribed level,
   in response to determining that the restriction of the charging power is severer than the prescribed level, control the notification device to notify the user of a waiting time until the charging is completed.

9. The power management system according to claim 1, wherein
   the charging controller is configured to carry out third charging control in response to determining that the pricing of the target power feed facility indicated by the pricing information falls under flat-rate pricing, the flat-rate pricing being pricing that a fee for one charging is flat,
   the charging controller is configured to, in the third charging control, determine whether the restriction of the charging power is severer than the prescribed level, upon determining that the restriction of the charging power is not severer than the prescribed level, quit the charging in response to the SOC of the power storage being equal to or larger than a further threshold value while the charging is carried out, the further threshold value being larger than the threshold value, and upon determining that the restriction of the charging power is severer than the prescribed level, quit the charging in response to the SOC of the power storage being equal to or larger than the threshold value while the charging is carried out.

10. The power management system according to claim 9, wherein the vehicle further includes a notification device configured to give information on charging to a user, and the charging controller is configured to, upon determining that the restriction of the charging power is severer than the prescribed level in the third charging control, control the notification device to notify the user of a waiting time until the charging is completed.

11. The power management system according to claim 1, wherein the charging controller is configured to request the server to give the pricing information of the target power feed facility, and the server is configured to, in response to a request from the charging controller, obtain the pricing information of the target power feed facility and transmit the pricing information of the target power feed facility to the vehicle.

12. The power management system according to claim 3, wherein the charging controller is configured to control charging power for the power storage so as not to exceed the upper limit value of charging power for the power storage, and decrease the upper limit value of charging power for the power storage as a degree of deterioration over time of the power storage is higher.

13. A power management system, comprising:

a vehicle including a power storage and a charging controller; and a server including a database that manages pricing information on each of a plurality of power feed facilities, the server being configured to transmit the pricing information, wherein each of the plurality of power feed facilities is electrically connected to a power grid, the charging controller is configured to carry out charging of a power storage with charging power to be restricted, the charging controller is configured to:

obtain, in the charging of the power storage by using a target power feed facility of the plurality of power feed facilities, the pricing information indicating pricing of the target power feed facility;

carry out first charging control in response to determining that the pricing of the target power feed facility indicated by the pricing information falls under time-based pricing, the time-based pricing being pricing that a fee is charged based on a charging time period; and carry out second charging control in response to determining that the pricing of the target power feed facility indicated by the pricing information falls under usage-based pricing, the usage-based pricing being pricing that a fee is charged based on an amount of electric power for charging;

the charging controller is configured to, in the second charging control, quit the charging in response to an SOC of the power storage being equal to or larger than a threshold value while the charging is carried out, and the charging controller is configured to, in the first charging control, determine whether restriction of the charging power is severer than a prescribed level, upon determining that the restriction of the charging power is not severer than the prescribed level, quit the charging in response to the SOC of the power storage being equal to or larger than the threshold value while the charging is carried out, upon determining that the restriction of the charging power is severer than the prescribed level, issue to a user, a request to provide an input indicating whether to permit change of the threshold value to another threshold value, upon reception of an input indicating prohibition from the user, quit charging in response to the SOC of the power storage being equal to or larger than the threshold value while the charging is carried out, and upon reception of an input indicating permission from the user, quit the charging in response to the SOC of the power storage being equal to or larger than the another threshold value while the charging is carried out, the another threshold value being smaller than the threshold value.

14. The power management system according to claim 13, wherein the vehicle is configured to travel with electric power stored in the power storage, and the charging controller is configured to set the SOC of the power storage being equal to or larger than the another threshold value such that the power storage is charged with electric power in an amount necessary for the vehicle to reach a prescribed location.

15. The power management system according to claim 13, wherein the charging controller is configured to obtain a destination of the vehicle, and set a prescribed location based on the destination, by setting, as the prescribed location, any one of the destination and a power feed facility present on a travel route before the vehicle reaches the destination.

16. A power management system, comprising:

a vehicle including a power storage and a charging controller; and a server including a database that manages pricing information on each of a plurality of power feed facilities, the server being configured to transmit the pricing information, wherein each of the plurality of power feed facilities is electrically connected to a power grid, the charging controller is configured to:

carry out charging of the power storage with charging power to be restricted;

obtain, in the charging of the power storage by using a target power feed facility of the plurality of power feed facilities, the pricing information indicating pricing of the target power feed facility;

carry out first charging control in response to determining that the pricing of the target power feed facility indicated by the pricing information falls under time-based pricing, the time-based pricing being pricing that a fee is charged based on a charging time period; and carry out second charging control in response to determining that the pricing of the target power feed facility indicated by the pricing information falls under usage-based pricing, the usage-based pricing being pricing that a fee is charged based on an amount of electric power for charging;

the charging controller is further configured to, in the second charging control, quit the charging in response to an amount of charging being equal to or larger than a threshold value while the charging is carried out, the charging controller is further configured to, in the first charging control, determine whether restriction of the charging power is severer than a prescribed level, upon determining that the restriction of the charging power is not severer than the prescribed level, quit the charging in response to the amount of charging being equal to or higher than the threshold value while the charging is carried out, and upon determining that the restriction of the charging power is severer than the prescribed level, quit the charging in response to the amount of charging being equal to or higher than another threshold value while the charging is carried out, the another threshold value being smaller than the threshold value.

* * * * *